US012684411B2

(12) United States Patent
Blasco Serrano et al.

(10) Patent No.: US 12,684,411 B2
(45) Date of Patent: Jul. 14, 2026

(54) CONGESTION CONTROL FOR SIDELINK TRANSMISSIONS

(71) Applicant: Telefonaktiebolaget LM Ericsson (publ), Stockholm (SE)

(72) Inventors: Ricardo Blasco Serrano, Espoo (FI); Jose Angel Leon Calvo, Aachen (DE); Shehzad Ali Ashraf, Munich (DE); Jeong Hun Kim, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 18/261,045

(22) PCT Filed: Jan. 18, 2022

(86) PCT No.: PCT/EP2022/051052
§ 371 (c)(1),
(2) Date: Jul. 11, 2023

(87) PCT Pub. No.: WO2022/152948
PCT Pub. Date: Jul. 21, 2022

(65) Prior Publication Data
US 2024/0064564 A1 Feb. 22, 2024

Related U.S. Application Data

(60) Provisional application No. 63/138,628, filed on Jan. 18, 2021.

(51) Int. Cl.
*H04W 28/02* (2009.01)
*H04L 43/0882* (2022.01)

(52) U.S. Cl.
CPC ..... *H04W 28/0289* (2013.01); *H04L 43/0882* (2013.01)

(58) Field of Classification Search
CPC ........................ H04W 28/0289; H04L 43/0882
(Continued)

(56) References Cited

U.S. PATENT DOCUMENTS

2016/0205584 A1* 7/2016 Baek ..................... H04W 24/08
455/553.1
2018/0034526 A1* 2/2018 Lee ...................... H04B 7/0647
(Continued)

FOREIGN PATENT DOCUMENTS

WO 2017135126 A1 8/2017
WO WO-2018062832 A1 * 4/2018 .......... H04W 72/569

OTHER PUBLICATIONS

"3GPP TS 26.348 V17.0.0", 3rd Generation Partnership Project; Technical Specification Group Services and System Aspects; Northbound Application Programming Interface (API) for Multimedia Broadcast/Multicast Service (MBMS) at the xMB reference point (Release 17), Apr. 2022, pp. 1-49.
(Continued)

*Primary Examiner* — Hermon Asres
(74) *Attorney, Agent, or Firm* — Murphy, Bilak & Homiller, PLLC

(57) ABSTRACT

Embodiments of the present disclosure provide a method (1200) for congestion control during sidelink transmissions. The method (1200) is performed by a user equipment, UE (1300), in a wireless communication network. The method (1200) comprises determining (1220) that the UE is actively receiving in a subset of resources during a time interval and estimating (1240) a congestion control metric for the time interval during which the UE is actively receiving in the subset of resources. The method (1200) comprises selecting (1260) one or more transmission parameters to use for sidelink transmissions in accordance with the estimated congestion control metric. Further, the method (1200) comprises performing (1280) sidelink transmission using the
(Continued)

| V2X UE2 | —— V5 —— | V2X UE1 | —— V1 —— | V2X application server | selected one or more transmission parameters. Corresponding UE, and computer program products are also disclosed.

23 Claims, 12 Drawing Sheets

(58) Field of Classification Search
USPC ........................................................ 370/229
See application file for complete search history.

(56) References Cited

U.S. PATENT DOCUMENTS

| | | | |
|---|---|---|---|
| 2020/0228949 A1 | 7/2020 | Bharadwaj et al. | |
| 2020/0229171 A1 | 7/2020 | Khoryaev et al. | |
| 2024/0023109 A1* | 1/2024 | Elazzouni | H04L 1/1848 |

OTHER PUBLICATIONS

"3GPP TS 36.214 V15.0.0", 3rd Generation Partnership Project; Technical Specification Group Radio Access Network; Evolved Universal Terrestrial Radio Access (E-UTRA); Physical layer; Measurements (Release 15), Sep. 2017, pp. 1-23.
"3GPP TS 38.214 V15.0.0", 3rd Generation Partnership Project; Technical Specification Group Radio Access Network; NR; Physical layer procedures for data (Release 15), Dec. 2017, pp. 1-71.
"3GPP TS 38.401 V16.3.0", 3rd Generation Partnership Project; Technical Specification Group Radio Access Network; NG-RAN; Architecture description (Release 16), Sep. 2020, pp. 1-78.
"3GPP TS 23.501 V16.6.0", 3rd Generation Partnership Project; Technical Specification Group Services and System Aspects; System architecture for the 5G System (5GS); Stage 2 (Release 16), Sep. 2020, pp. 1-447.
"On multi-carrier and DRX operation for SL", 3GPP TSG RAN WGI #103-e, RI-2009123, e-Meeting, Oct. 26-Nov. 13, 2020, pp. 1-3.
"3GPP TS 23.285 V16.1.0", 3rd Generation Partnership Project; Technical Specification Group Services and System Aspects; Architecture enhancements for V2X services (Release 16), Sep. 2019, pp. 1-37.
"3GPP TS 23.286 V16.1.0", 3rd Generation Partnership Project; Technical Specification Group Services and System Aspects; Application layer support for Vehicle-to-Everything (V2X) services; Functional architecture and information flows; (Release 16), Sep. 2019, pp. 1-59.
"3GPP TS 38.321 V16.3.0", 3rd Generation Partnership Project; Technical Specification Group Radio Access Network; NR; Medium Access Control (MAC) protocol specification (Release 16), Dec. 2020, pp. 1-156.
"3GPP TS 38.211 V16.3.0", 3rd Generation Partnership Project; Technical Specification Group Radio Access Network; NR; Physical channels and modulation (Release 16), Sep. 2020, pp. 1-22.
"3GPP TS 38.215 V16.4.0", 3rd Generation Partnership Project; Technical Specification Group Radio Access Network; NR; Physical layer measurements (Release 16), Dec. 2020, pp. 1-25.
"3GPP TS 38.213 V16.3.0", 3rd Generation Partnership Project; Technical Specification Group Radio Access Network; NR; Physical layer procedures for control (Release 16), Sep. 2020, pp. 1-179.
"3GPP TS 33.401 V16.2.0", 3rd Generation Partnership Project; Technical Specification Group Services and System Aspects; 3GPP System Architecture Evolution (SAE); Security architecture (Release 16), Mar. 2020, pp. 1-167.
"3GPP TR 38.801 V2.0.0 (Mar. 2017)", 3rd Generation Partnership Project; Technical Specification Group Radio Access Network; Study on New Radio Access Technology; Radio Access Architecture and Interfaces (Release 14), Mar. 2017, pp. 1-90.
"Discussion on physical layer design considering sidelink DRX operation", 3GPP TSG RAN WG1 #103-e, R1-2007897, E-Meeting, Oct. 26-Nov. 13, 2020, pp. 1-15.
"FL summary for AI 8.11.2.1—resource allocation for power saving", Moderator, 3GPP TSG RAN WG1 #103-e, R1-2009584, e-Meeting, Oct. 26-Nov. 13, 2020, pp. 1-64.

* cited by examiner

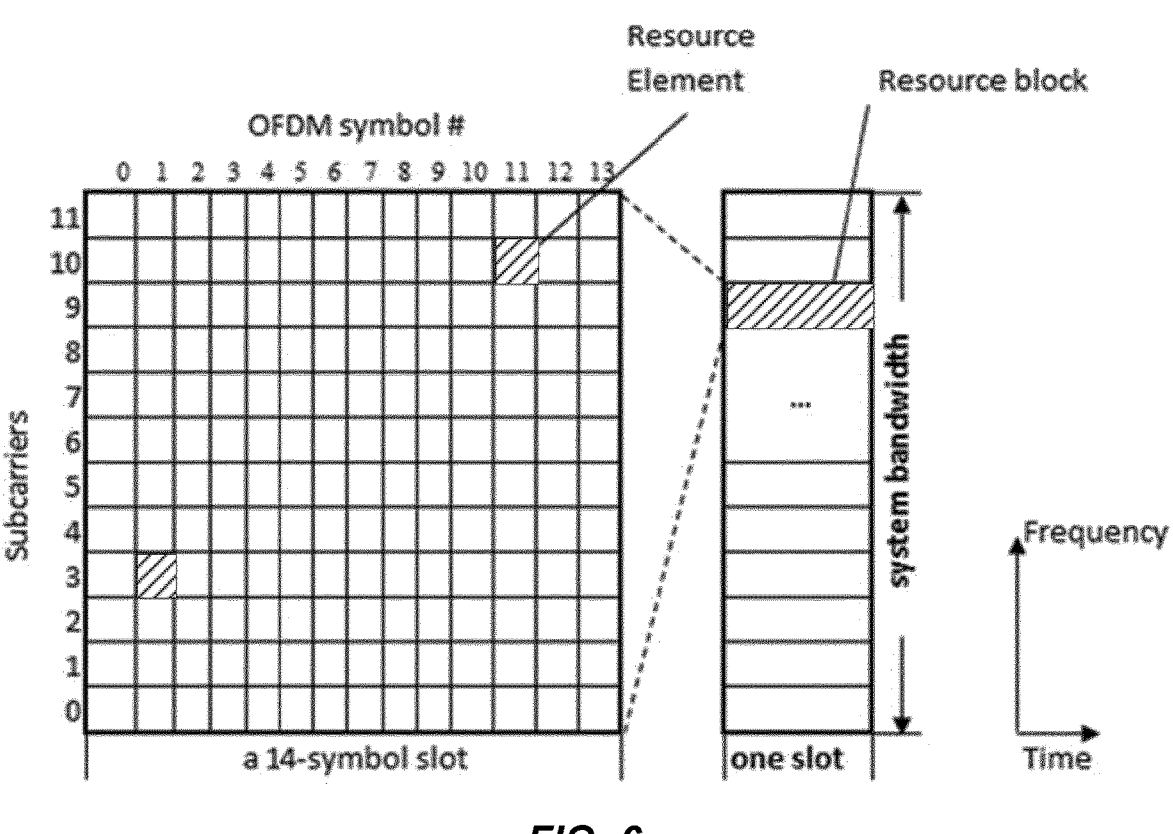
FIG. 6
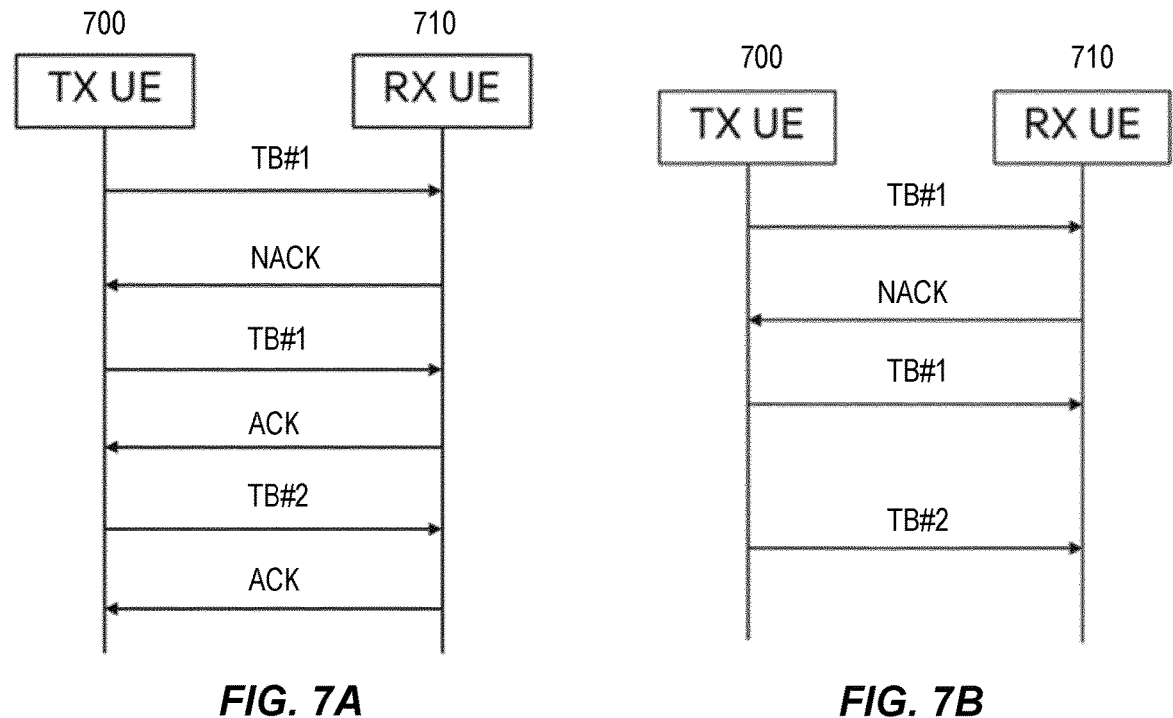
FIG. 7A      FIG. 7B

1200

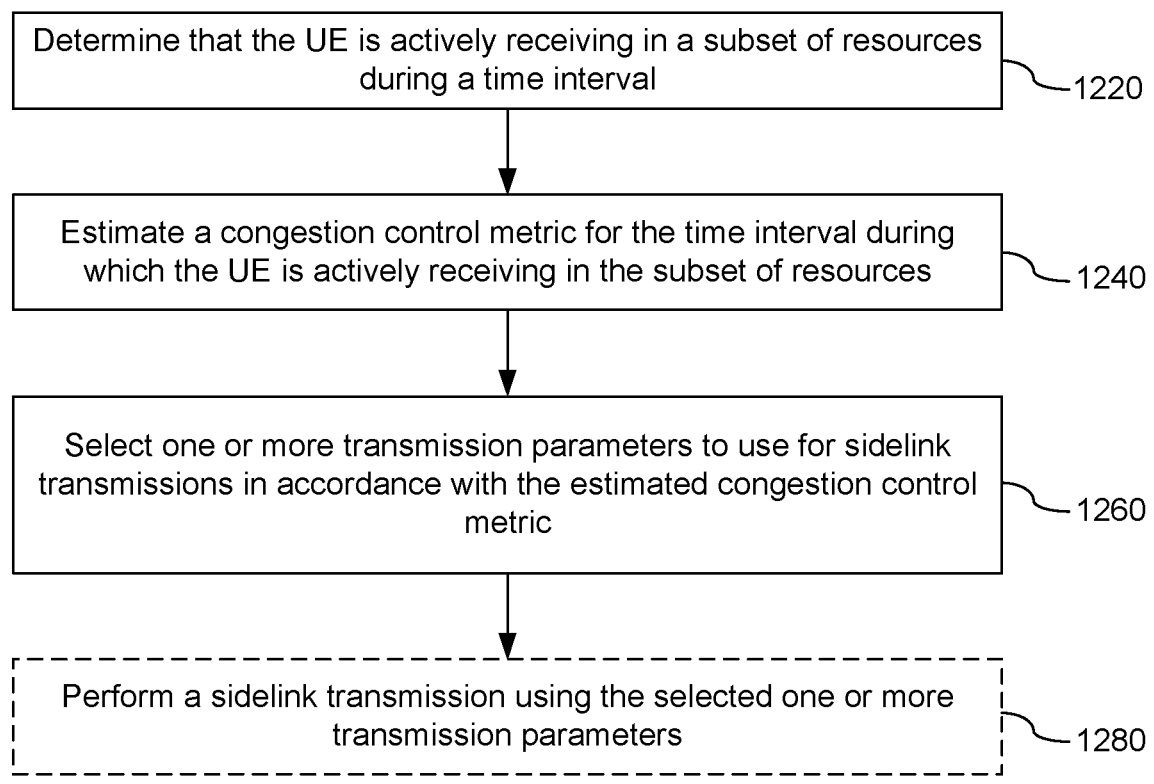

Determine that the UE is actively receiving in a subset of resources during a time interval ⁓1220

Estimate a congestion control metric for the time interval during which the UE is actively receiving in the subset of resources ⁓1240

Select one or more transmission parameters to use for sidelink transmissions in accordance with the estimated congestion control metric ⁓1260

Perform a sidelink transmission using the selected one or more transmission parameters ⁓1280

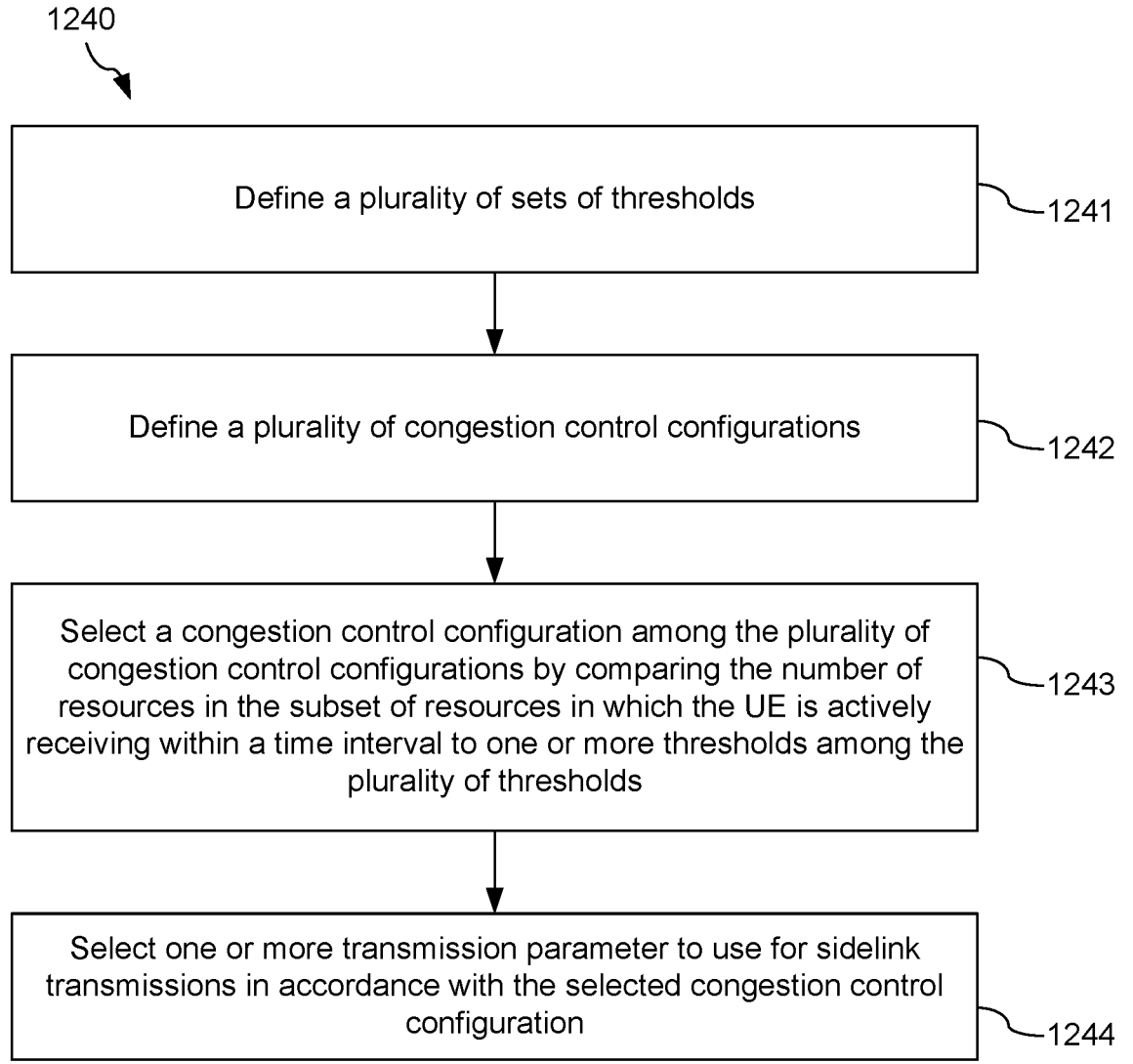

Define a plurality of sets of thresholds ⟶1241

Define a plurality of congestion control configurations ⟶1242

Select a congestion control configuration among the plurality of congestion control configurations by comparing the number of resources in the subset of resources in which the UE is actively receiving within a time interval to one or more thresholds among the plurality of thresholds ⟶1243

Select one or more transmission parameter to use for sidelink transmissions in accordance with the selected congestion control configuration ⟶1244

*FIG. 12B*

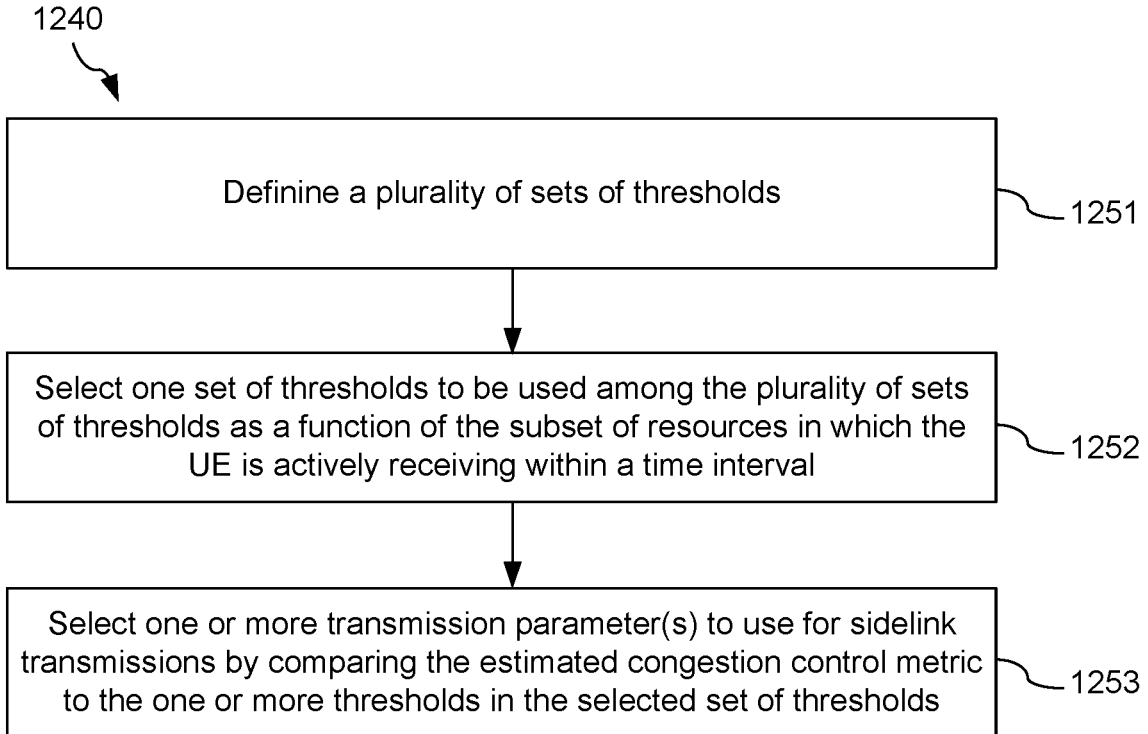

1240

Definine a plurality of sets of thresholds ⟍1251

Select one set of thresholds to be used among the plurality of sets of thresholds as a function of the subset of resources in which the UE is actively receiving within a time interval ⟍1252

Select one or more transmission parameter(s) to use for sidelink transmissions by comparing the estimated congestion control metric to the one or more thresholds in the selected set of thresholds ⟍1253

*FIG. 12C*

CONGESTION CONTROL FOR SIDELINK TRANSMISSIONS

TECHNICAL FIELD

The present disclosure relates generally to the field of wireless communication. More particularly, it relates to method, user equipment, UE and computer program products for congestion control during sidelink transmissions in a wireless communication network.

BACKGROUND

The use of the third generation partnership project long term evolution, 3GPP LTE, systems has increased due to both an increased variety of user equipments, UEs using network resources as well as an increase in the amount of data and bandwidth being used by various applications, such as video streaming, operating on these UEs. One type of increasingly popular communication type is vehicle-to-anything, V2X communications, and in particular vehicle-to-vehicle, V2V communications.

Communication of vehicles with each other i.e., vehicle-to-vehicle, or V2V, with infrastructure, V2I, and with vulnerable road users are expected to increase user safety and comfort, and to improve traffic management and/or reduce congestion, and to reduce vehicle fuel consumption and emissions. Collectively, these communication modes are commonly referred to as vehicle to everything, V2X. An extensive set of use cases for V2X have been developed and, based on these use cases, V2X communication requirements have been developed.

Within these use cases, the end-user communication equipment is commonly referred to as a user equipment (more specifically, V2X UE), and the entity serving an application associated with a user case is commonly referred to as an application server (more specifically, V2X AS). For example, FIG. 1 shows a simplified architectural model for the V2X application layer as specified in 3GPP Technical Standard, TS 23.285. In the figure, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

Furthermore, a reference point V1 supports the V2X application-related interactions between V2X UE and V2X AS and is further specified in 3GPP TS 23.285. This reference point is supported for both unicast and multicast delivery modes. Likewise, a reference point V5 supports the interactions between the V2X UEs and is also specified in 3GPP TS 23.285.

FIG. 2 shows a V2X application layer functional model, which further specifies the functional entities. For example, the V2X AS includes a V2X application enabler (VAE) server (as discussed, e.g., in 3GPP Technical Report (TR) 23.286) and a V2X application-specific server. The VAE server provides the V2X application layer support functions to the V2X application specific server over Vs reference point.

Similarly, each of the V2X UEs include a VAE client and a V2X application-specific client. The VAE client provides the V2X application layer support functions to the V2X application specific-client over Vc reference point. The VAE client of V2X UE1 communicates with the VAE server over V1-AE reference point, and the V2X application-specific client of V2X UE1 communicates with V2X application-specific server over V1-APP reference point. Similarly, the VAE client of V2X UE2 communicates with the VAE client of V2X UE2 over V5-AE reference point, and the V2X application-specific client of V2X UE2 communicates with the V2X application-specific client of V2X UE2 over V5-APP reference point. As discussed above, V2X UE1 can also act as a UE-to-network relay for V2X UE2, enabling the clients comprising V2X UE1 to access the V2X AS over the respective V1 reference points.

The VAE server interacts with 3GPP networks (e.g., Evolved Packet Subsystem (EPS) and/or 5G subsystem (5GS)) via the V2, MB2, xMB, Rx, T8, Npcf, and/or N33 reference points. A message on the V1-AE interface can be sent as unicast, transparent multicast via xMB, or transparent multicast via MB2. The non-transparent multicast via xMB (as specified in 3GPP TS 26.348) is triggered by a V1-AE message. Multicast distribution can be in either transparent or non-transparent mode.

Depending on the particular application, V2X and/or ITS messages may carry both safety-related and non-safety-related information. Moreover, each of the applications and services may be associated with specific requirements, e.g., latency, reliability, capacity, etc. European Telecommunication Standards Institute (EISI) has defined two types of messages for road safety: Co-operative Awareness Message, CAM and Decentralized Environmental Notification Message, DENM.

A CAM can be used by a vehicle (e.g., an emergency vehicle) to broadcast a notification to surrounding vehicles and/or devices of the vehicle's presence and other relevant parameters. CAMs target other vehicles, pedestrians, and infrastructure, and are handled by their applications. CAMs also serve as active assistance to safety driving for normal traffic. The availability of a CAM is checked every 100 ms, yielding a maximum detection latency of 100 ms for most messages. However, the latency requirement for pre-crash sensing warning CAM is 50 ms. On the other hand, DENMs are event-triggered, such as by braking, and the availability of a DENM message is also checked every 100 ms, yielding a maximum detection latency of 100 ms. The package size of CAMs and DENMs varies from 100+ to 800+ bytes and the typical size is around 300 bytes. Each message is supposed to be detected by all vehicles in proximity.

A V2X UE can support unicast communication via the radio interface (also referred to as "Uu") to a 3GPP radio access network (RAN), such as the LTE Evolved-UTRAN (E-UTRAN) or Next-Generation RAN (NG-RAN). A V2X UE can support unicast over the PC5 interface, whereby UEs can communicate with each other directly via "sidelink" rather than indirectly via the 3GPP RAN. V2X sidelink (SL) is a type of device-to-device (D2D) communication.

FIG. 3 shows a high-level view of an exemplary C-ITS environment in which various V2X communications can be employed. At the bottom of FIG. 3, the two left-most users are conventional communication devices (also referred to as "user equipment" or UE, for short) that communicate only via the mobile network(s) shown in the middle layer. In contrast, the right-mode user is only capable of communicating via V2X SL, such as with other nearby users having compatible V2X SL capabilities. However, the middle two users are capable of communicating both via the mobile network(s) in the middle layer, as well as directly with other nearby users having compatible V2X SL capabilities.

Resources for UE V2X SL communication can be configured on a dedicated C-ITS carrier (e.g., in a dedicated ITS band) or on a carrier of the UE's serving cell provided by a 3GPP RAN (e.g., in licensed cellular band). In the latter case, the serving cell's time/frequency resources must be shared by conventional cellular communication (over Uu link) and V2X SL (or D2D) communications. Typically, the SL resources are time multiplexed with serving cell uplink, UL, resources used for cellular communication.

In general, a resource pool defines a subset of available subframes and resource blocks for either SL transmission or reception. A D2D UE can be configured with multiple transmit resource pools and multiple receive resource pools, e.g., semi-statically via radio resource control, RRC, signaling. When data is to be sent using a resource pool, the actual transmission resources are selected dynamically from within the pool by either the serving network node (e.g., eNB) or autonomously by the UE itself according to various rules and/or requirements.

The first 3GPP standardization of SL was in Long-Term Evolution (LTE, also referred to as 4G) Release 12, Rel-12, targeting public safety use cases. Since then, a number of enhancements have been introduced to broaden the use cases that could benefit from D2D technology. For example, the D2D extensions in LTE Rel-14 and Rel-15 include supporting V2X communication, such as described above.

3GPP Rel-16 specifies SL interface for 5G New Radio (NR). The NR Rel-16 SL targets advanced V2X services, which can be categorized into four use case groups: vehicles platooning, extended sensors, advanced driving, and remote driving. The advanced V2X services require a new SL in order to meet the stringent requirements in terms of latency and reliability. The NR SL is designed to provide higher system capacity and better coverage, and to allow for an easy extension to support the future development of advanced V2X services and other related services.

3GPP NR SL specifications include mechanisms for congestion control. These congestion control mechanisms are designed to ensure that the different UEs make fair use of resources, possibly according to the priorities of their transmissions. Congestion control is crucial in many SL scenarios, in particular those with minimal network control and/or coordination between UEs.

3GPP Rel-17 includes SL enhancements that aim to extend V2X support and covering other use cases (UCs) such as public safety. One objective is to improve SL energy consumption of UEs that rely on a battery (e.g., pedestrian UEs, first responder UEs, etc.). One way to achieve this objective is by turning off the receiver of the UE in a coordinated manner by means of a discontinuous reception, DRX, feature, which defines a set of rules that determine when the UE is expected to be actively receiving and also when the UE is not expected to be actively receiving.

The existing 3GPP specification defines two objectives for enhancing sidelink which include the SL DRX and partial sensing. As described above, the DRX is a framework that allows a transmitter of the UE to know when to transmit or to expect a transmission, while the partial sensing is a complementary feature to DRX which sallow for Mode 2 operation even if the UE is not actively receiving at all times. Thus, with the sidelink DRX and partial sensing the UE switches its receiver ON and OFF regularly.

However, turning off the receiver can cause various problems for SL congestion control, which in general relies on a UE continuously monitoring the channel. For example, the procedures and measurements used for congestion control assume that the UE is continuously monitoring the channel. Therefore, when the UE is not actively receiving all the time, the measurements are not accurate. Moreover, different UEs may obtain very different measurements by being active at different times and for different durations.

Consequently, there is a need for an improved method and arrangement for congestion control during SL transmissions that alleviates at least some of the above cited problems.

SUMMARY

Especially, when the UE is not actively receiving all the time, by the introduction of DRX feature and partial sensing, the measurements made by the UE are not accurate as the UE switches its receiver ON and OFF regularly. Therefore it is desirable to have congestion control during SL transmissions by considering activity of the receiver of the UE and reception of an expected signal at the UE.

It is therefore an object of the present disclosure to provide a method, a user equipment, and a computer program product for congestion control during SL transmissions that seeks to mitigate, alleviate, or eliminate all or at least some of the above-discussed drawbacks of presently known solutions.

This and other objects are achieved by means of a method, a computer program product, and a UE as defined in the appended claims.

The term exemplary is in the present context to be understood as serving as an instance, example or illustration.

According to a first aspect of the present disclosure, a method for congestion control during sidelink transmissions. The method is performed by a user equipment, UE, in the wireless communication network. The method comprises determining that the UE is actively receiving in a subset of resources during a time interval and estimating a congestion control metric for the time interval during which the UE is actively receiving in the subset of resources. Further, the method comprises selecting one or more transmission parameters to use for sidelink transmissions in accordance with the estimated congestion control metric.

In some embodiments, the subset of resources comprises one or more of a first subset of time intervals within the time interval, a second subset of sub-channels within a system bandwidth and a third subset of the carriers configured for the UE.

In some embodiments, the step of estimating a congestion control metric for the time interval during which the UE is actively receiving in the subset of resources comprises estimating a congestion control metric in relation to the subset of resources in which the UE is actively receiving within the time interval.

In some embodiments, the method further comprising obtaining a subset of a total number of configured sub-channels in which the UE is actively receiving and estimating the congestion control metric as a portion of the subset of the total number of configured sub-channels.

In some embodiments, the step of estimating a congestion control metric for the time interval during which the UE is actively receiving in the subset of resources comprises one or more of estimating a congestion control metric in relation to the first subset of time intervals, estimating a congestion control metric in relation to the second subset of sub-channels and estimating a congestion control metric in relation to the third subset of the carriers configured for the UE.

In some embodiments, the method further comprising defining a plurality of sets of thresholds and defining a plurality of congestion control configurations. The method comprising selecting a congestion control configuration among the plurality of congestion control configurations by comparing the number of resources in the subset of resources in which the UE is actively receiving within a time interval to one or more thresholds among the plurality of thresholds and selecting one or more transmission parameters to use for sidelink transmissions in accordance with the selected congestion control configuration.

In some embodiments, the method further comprising defining a plurality of sets of thresholds and selecting one set of thresholds to be used among the plurality of sets of thresholds as a function of the subset of resources in which the UE is actively receiving within a time interval. The method comprising selecting one or more transmission parameters to use for sidelink transmissions by comparing the estimated congestion control metric to the one or more thresholds in the selected set of thresholds.

In some embodiments, the step of estimating a congestion control metric for the time interval comprises segmenting the time interval into a plurality of measurement windows and determining respective subvalues for the congestion control metric, for each measurement window. Further, the method comprising estimating the congestion control metric by combining the respective subvalues for each measurement window.

In some embodiments, the step of estimating a congestion control metric by combining the respective subvalues for each measurement window comprises assigning a weighted factor to each measurement window, determining respective subvalues with the assigned weighted factor for each measurement window and combining the respective subvalues with the assigned weighted factor for estimating the congestion control metric.

In some embodiments, the weighted factor is determined based on a time interval associated with each measurement window.

In some embodiments, the method further comprising performing a sidelink transmission using the selected one or more transmission parameters.

In some embodiments, congestion control metric is one or more of a channel busy ratio, CBR and a channel occupancy ratio, CR.

According to a second aspect of the present disclosure, a user equipment, UE, for congestion control during sidelink transmissions in a wireless communication network, the UE being adapted for determining that the UE is actively receiving in a subset of resources during a time interval. Further, the UE being adapted for estimating a congestion control metric for the time interval during which the UE is actively receiving in the subset of resources and selecting one or more transmission parameters to use for sidelink transmissions in accordance with the estimated congestion control metric.

According to a third aspect of the present disclosure, there is provided a computer program product comprising a non-transitory computer readable medium, having thereon a computer program comprising program instructions, the computer program is loadable into a data processing unit and configured to cause execution of the method according to the first aspect when the computer program is run by the data processing unit.

According to a fourth aspect of the present disclosure, there is provided a computer program comprising instructions which, when the computer program is executed by a computer, cause the computer to carry out the method according to the first aspect.

An advantage of some embodiments is that the congestion control is provided with partial or discontinuous reception in time domain and/or frequency domain.

An advantage of some embodiments is to estimate congestion control metrics with partial or discontinuous reception in time domain and/or frequency domain.

An advantage of some embodiments is to achieve power savings at the UE by allowing the UE to turn off the receiver at certain time intervals.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 6 shows an exemplary mini-slot arrangement within an NR slot;

FIGS. 7A and 7B illustrate example HARQ techniques for NR sidelink;

FIGS. 12A-12D illustrate flow charts illustrating example method steps performed by a user equipment, UE, according to some embodiments;

DETAILED DESCRIPTION

Figures 1, 2:
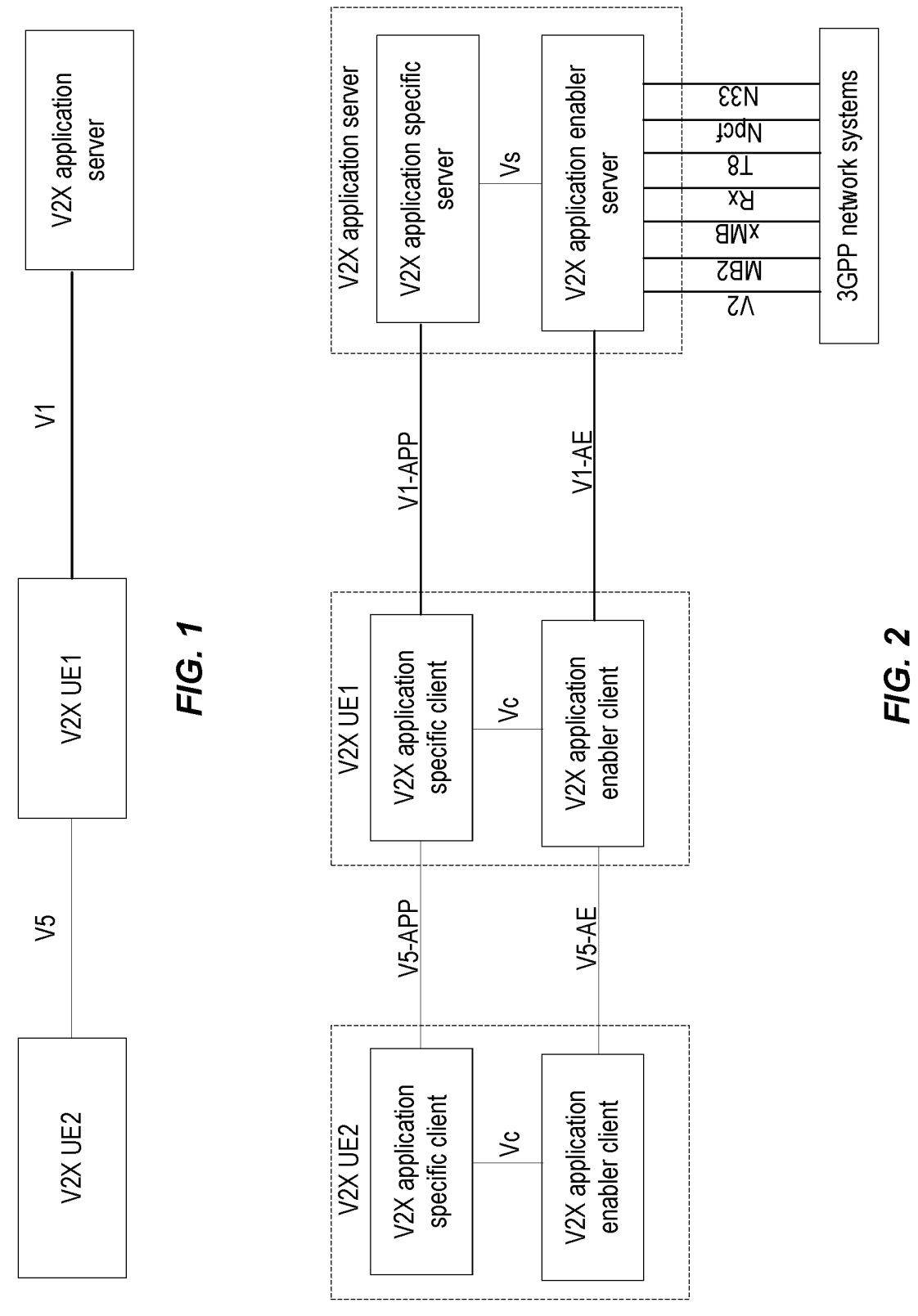
FIG. 1 shows an example architecture for a Vehicle-to-everything, V2X, communication.
FIG. 2 shows an example illustration of V2X communication model.
Figure 3:
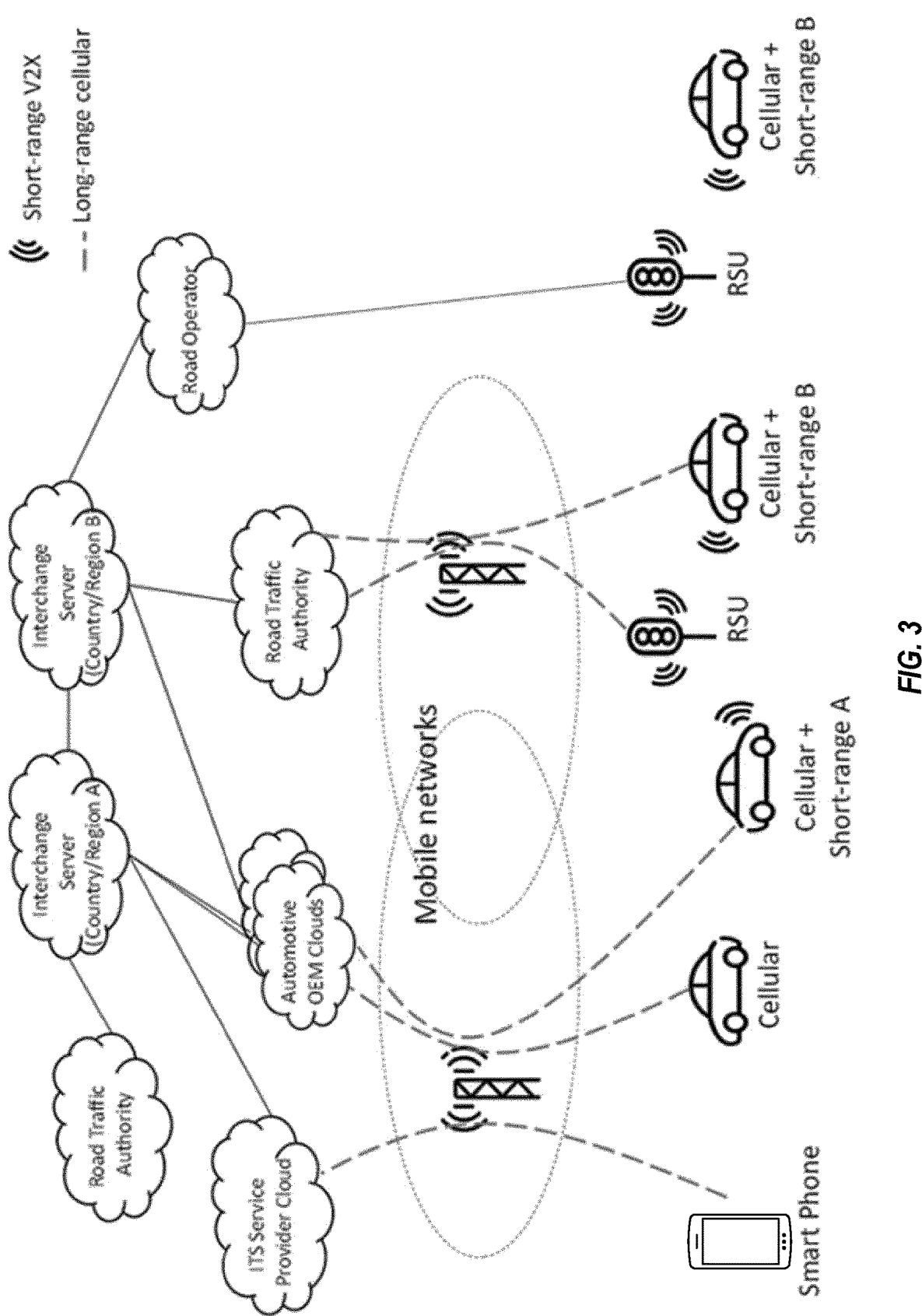
FIG. 3 shows an example C-ITS environment for implementing various V2X communications.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the present disclosure, user equipments, UEs, also known as mobile terminals, and/or wireless terminals are enabled to communicate wirelessly with a network node in a wireless communication network.

Typically, a network node may serve or cover one or several cells of the wireless communication network. In general, the network node provides radio coverage in the cell(s) and communicates over an air interface with the UE(s) operating on radio frequencies within its range. The network node may be also referred to as "eNB", "eNodeB", "NodeB" or "gNB", depending on the technology and terminology used. In the present disclosure, the network node may also be referred to as a base station, BS.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/ or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LIE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a user plane function (UPF), a network exposure function (NEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (Ion devices, vehicle-mounted wireless terminal devices, D2D UEs, V2X UEs, etc. Unless otherwise noted, the term "wireless device" is used interchangeably herein with the term "user equipment" (or "UE" for short).

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Resource: As used herein, a "resource" can correspond to any type of physical resource or radio resource expressed in terms of time and/or frequency. Examples of time resources include symbol, time slot, subframe, radio frame, TTI, interleaving time, etc. Examples of time-frequency resources include subcarrier, resource block (RB), etc. An RB may also be called as physical RB (PRB), virtual RB (VRB), etc.

Link: As used herein, "link" or "radio link" can correspond to a radio transmission path used for any type of cellular or D2D operation between two endpoints (e.g., network nodes, UEs, wireless devices, etc.). Examples of links used for cellular operation are links on Uu interface, uplink/reverse link (UE transmission to BS), downlink/forward link (BS transmission to UE), etc. Examples of links used for D2D operations are links on PC5, sidelinks, etc.

Channel: As used herein, a "channel" can be a logical, transport or physical channel. A channel may comprise and/or be arranged on one or more carriers and/or a plurality of subcarriers. A channel carrying and/or for carrying control signaling/control information may be considered a control channel (e.g., PDCCH), in particular if it is a physical layer channel and/or if it carries control plane information. Similarly, a channel carrying and/or for carrying data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

It should be noted that the description given herein focuses on a 3GPP cellular communications system and, as such, 3GPP terminology or terminology similar to 3GPP terminology is generally used throughout this disclosure. However, the concepts disclosed herein are not limited to a 3GPP system. Other wireless systems, including without limitation Wide Band Code Division Multiple Access, WCDMA, Worldwide Interoperability for Microwave Access, WiMax, Ultra Mobile Broadband, UMB, and Global System for Mobile Communications, GSM, may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As briefly mentioned above, turning off a UE's receiver can cause various problems, issues for SL congestion control, which in general relies on a UE continuously monitoring the channel. This is discussed in more detail below after the following introduction to 5G/NR network architecture and radio interface.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives.

For example, URLLC is intended to provide a data service with extremely strict error and latency requirements, e.g., error probabilities as low as $10^{-5}$ or lower and 1 ms end-to-end latency or lower. However, the peak data rate requirements are moderate. For eMBB, the latency and error probability requirements can be less stringent than URLLC, whereas the required peak rate and/or spectral efficiency can be higher than URLLC. In addition, NR is targeted to support deployment in lower-frequency spectrum similar to LTE, and in very-high-frequency spectrum (referred to as "millimeter wave" or "mmW").

Figure 4:
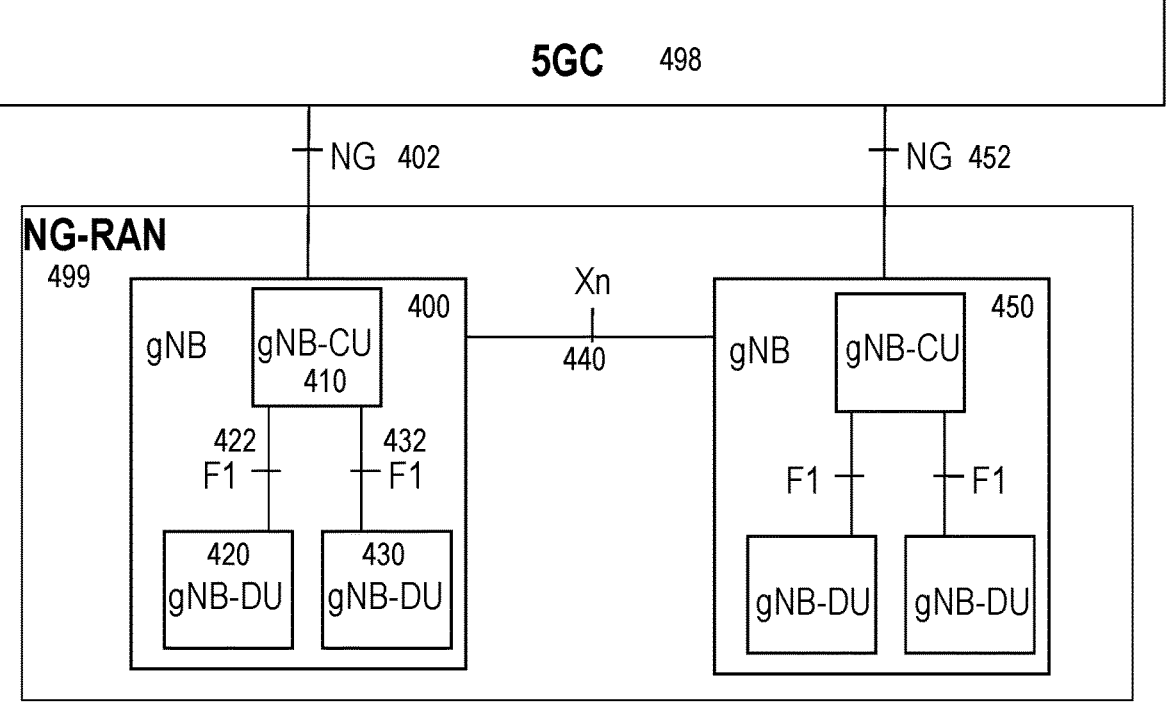
FIG. 4 shows a high-level view of an example 5G network architecture.

FIG. 4 shows an example 5G network architecture, including a Next Generation RAN (NG-RAN) 499 and a 5G Core (5GC) 498. NG-RAN 499 can include one or more gNodeB's (gNBs) connected to the 5GC via one or more NG interfaces, such as gNBs 400, 450 connected via interfaces 402, 452, respectively. More specifically, gNBs 400, 450 can be connected to one or more Access and Mobility Management Functions (AMF) in the 5GC 498 via respective NG-C interfaces. Similarly, gNBs 400, 450 can be connected to one or more User Plane Functions (UPFs) in 5GC 498 via respective NG-U interfaces.

Although not shown, in some deployments 5GC 498 can be replaced by an Evolved Packet Core (EPC), which conventionally has been used together with LTE E-UTRAN. In such deployments, gNBs 400, 450 can connect to one or more Mobility Management Entities (MMEs) in EPC 498 via respective S1-C interfaces. Similarly, gNBs 400, 450 can connect to one or more Serving Gateways (SGWs) in EPC via respective NG-U interfaces.

In addition, the gNBs can be connected to each other via one or more Xn interfaces, such as Xn interface 440 between gNBs 400 and 450. The radio technology for the NG-RAN is often referred to as "New Radio" (NR). With respect to the NR interface to UEs (also referred to as the "Uu interface"), each of the gNBs can support frequency division duplexing (FDD), time division duplexing (TDD), or a combination thereof. The radio-related protocols between UEs and the NG-RAN over the Uu interface are generally referred to as the access stratum (AS), while the protocols between UEs and the core network (e.g., 5GC or EPC) are generally referred to as the non-access stratum (NAS).

NG-RAN 499 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 4 (and described in 3GPP TS 38.401 and 3GPP TR 38.801) include a Central Unit (CU or gNB-CU) and one or more Distributed Units (DU or gNB-DU). For example, gNB 400 includes gNB-CU 410 and gNB-DUs 420 and 430. CUs (e.g., gNB-CU 410) are logical nodes that host higher-layer protocols and perform various gNB functions such controlling the operation of DUs. A DU (e.g., gNB-DUs 420, 430) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 422 and 432 shown in FIG. 4. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Similar to LTE, the NR PHY uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes of one or more slots, and each slot includes 14 (for normal cyclic prefix) or 12 (for extended cyclic prefix) time-domain symbols.

Figure 5:
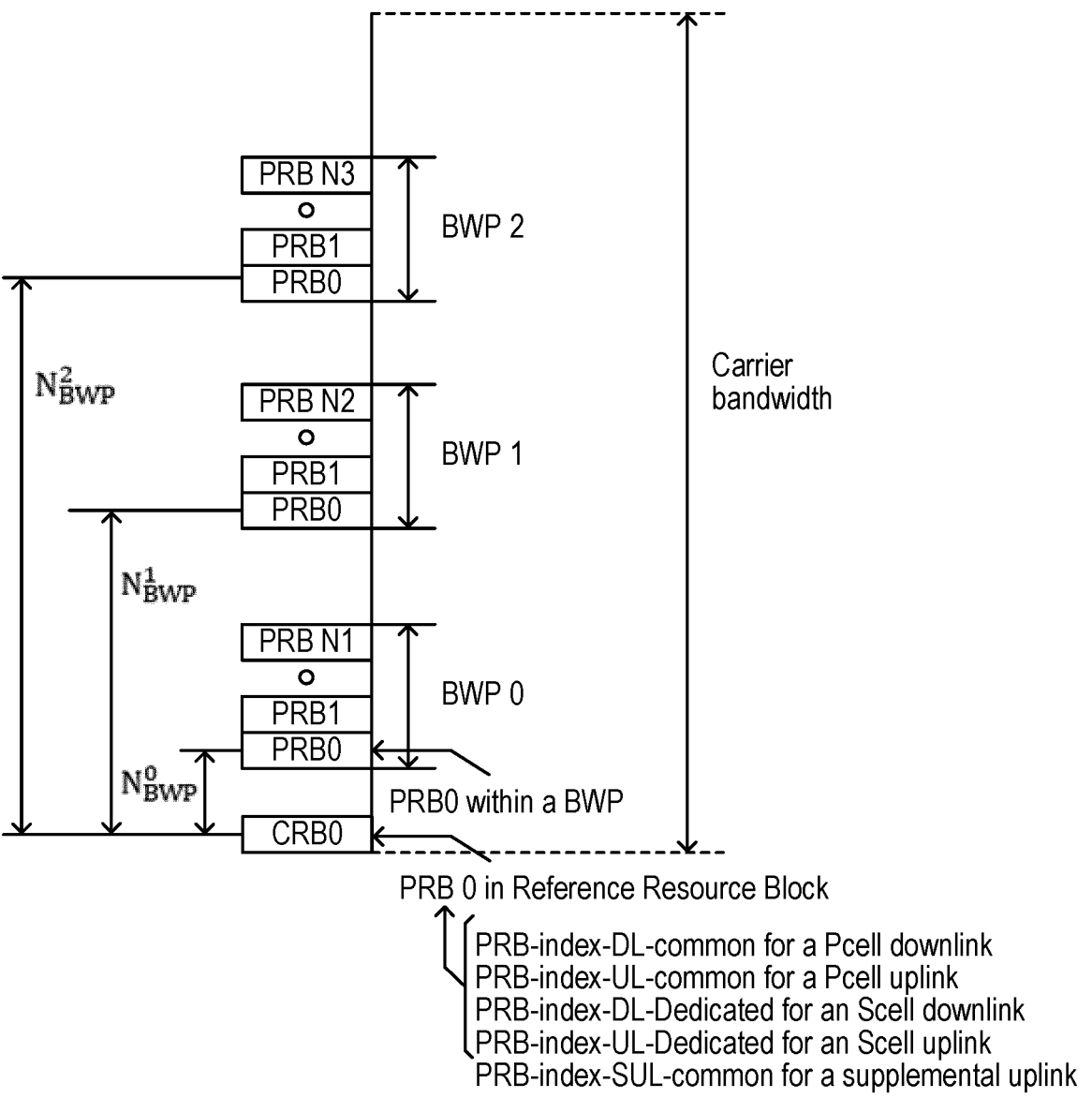
FIG. 5 shows an example arrangement of a New Radio, NR, timeslot, including an exemplary time-frequency resource grid.

FIG. 5 shows an example frequency-domain configuration for an NR UE. In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time. In the exemplary arrangement of FIG. 5, the UE is configured with three DL (or UL) BWPs, labelled BWP 0-2, respectively.

Common RBs (CRBs) are numbered from 0 to the end of the carrier bandwidth. Each BWP configured for a UE has a common reference of CRB0 (as shown in FIG. 5), such that a configured BWP may start at a CRB greater than zero. CRB0 can be identified by one of the following parameters provided by the network, as further defined in 3GPP TS 38.211 section 4.4 referred as following:

PRB-index-DL-common for DL in a primary cell (PCell, e.g., PCell or PSCell);

PRB-index-UL-common for UL in a PCell;

PRB-index-DL-Dedicated for DL in a secondary cell (SCell);

PRB-index-UL-Dedicated for UL in an SCell; and

PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. In the arrangement shown in FIG. 5, BWPs 0-2 start at CRBs $N^0_{BWP}$, $N^1_{BWP}$, and $N^2_{BWP}$, respectively. Within a BWP, PRBs are defined and numbered in the frequency domain from 0 to $$N^{size}_{BWP,i} - 1,$$

where i is the index of the particular BWP for the carrier. In the arrangement shown in FIG. 5, BWPs 0-2 include PRBs 0 to N1, N2, and N3, respectively.

Similar to LTE, each NR resource element (RE) corresponds to one OFDM subcarrier during one OFDM symbol interval. NR supports various SCS values $\Delta f=(15 \times 2^{\mu})$ kHz, where $\mu \in (0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^{\mu} \times 50$ MHz. Table 1 below summarizes the supported NR numerologies and associated parameters. Different DL and UL numerologies can be configured by the network.

starts, "DL-heavy" slots (e.g., one UL symbol), and "UL-heavy" slot with a single DL symbol carrying DL control information. Various guard periods before initial DL symbols ($T_{UL-DL}$) and before initial UL symbols ($T_{DL-UL}$) can also be used.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

In NR, the physical downlink control channel (PDCCH) transmitted by a gNB is confined to a region containing a particular number of symbols and a particular number of subcarriers, referred to as the control resource set (CORESET). For example, the CORESET can include the first two symbols of a slot and each of the remaining 12 symbols can contain physical data channels (PDCH), i.e., either DL (PDSCH) or UL (PUSCH). Depending on specific CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. The smallest unit used for defining CORESET is resource element group (REG), which spans one PRB in frequency and one OFDM symbol in time. A CORESET is functionally similar to the control region in LTE subframe. In NR, however, each REG consists of all 12 REs of one OFDM symbol in an RB, whereas an LTE REG includes only four REs. Like in LTE, the CORESET time domain size can be indicated by the physical control format indicator (CFI) channel (PCFICH). In LTE, the frequency bandwidth of the control region is fixed (i.e., to the total system bandwidth), whereas in NR, the frequency bandwidth of the CORESET is variable. CORESET resources can be indicated to a UE by radio resource control (RRC) signaling.

In addition to PDCCH, each REG in a CORESET contains demodulation reference signals (DM-RS) to aid in the

TABLE 1

| μ | $\Delta f = 2^{\mu} \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 µs | 66.67 µs | 71.35 µs | 1 ms | 50 MHz |
| 1 | 30 | Normal | 2.34 µs | 33.33 µs | 35.68 µs | 0.5 ms | 100 MHz |
| 2 | 60 | Normal, Extended | 1.17 µs | 16.67 µs | 17.84 µs | 0.25 ms | 200 MHz |
| 3 | 120 | Normal | 0.59 µs | 8.33 µs | 8.92 µs | 125 µs | 400 MHz |
| 4 | 240 | Normal | 0.29 µs | 4.17 µs | 4.46 µs | 62.5 µs | 800 MHz |

FIG. 6 shows an example time-frequency resource grid for an NR slot. As illustrated in FIG. 6, a resource block (RB) consists of a group of 12 contiguous OFDM subcarriers for a duration of a 14-symbol slot. Similar to LTE, a resource element (RE) consists of one subcarrier in one slot. An NR slot can include 14 OFDM symbols for normal cyclic prefix and 12 symbols for extended cyclic prefix. An NR slot can also be arranged with various combinations of UL and DL symbols. Options can include DL-only slots (i.e., no UL transmission) with on-time (symbol 0) or late (symbol >0)

estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in a REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

In NR Rel-15, the DCI formats 0_0/1_0 are referred to as "fallback DCI formats," while the DCI formats 0_1/1_1 are referred to as "non-fallback DCI formats." The fallback DCI support resource allocation type 1 in which DCI size depends on the size of active BWP. As such, DCI formats 0_1/1_1 are intended for scheduling a single transport block (TB) transmission with limited flexibility. On the other hand, the non-fallback DCI formats can provide flexible TB scheduling with multi-layer transmission.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine the CCEs corresponding to PDCCH candidates that a UE must monitor within a search space set. The hashing is done differently for different UEs. In this manner, CCEs used by the UEs are randomized and the probability of collisions between multiple UEs having messages included in a CORESET is reduced. Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers (u) and the total number of allocated PRBs before rate matching (npRB), the UE determines the Transport Block Size (TBS) for the PDSCH according to the procedure defined in 3GPP TS 38.214 V15.0.0 clause 5.1.3.2. Similar techniques can be used by the UE for PUSCH transmission scheduled by DCI (e.g., formats 0_0 or 0_1).

In both LTE and NR, UEs transmit UCI (Uplink Control Information) UEs on the physical UL control channel (PUCCH). For example, UCI can include HARQ feedback, CSI (Channel State Information) feedback, and SR (Scheduling Requests). Currently there are five different PUCCH formats (0-4) defined for carrying different types of UCI, where the sizes of the various formats range from one to 14 OFDM symbols. The various PUCCH formats are further defined in 3GPP TS 38.211.

NR supports two types of pre-configured resource assignments, both of which are similar to existing LTE semi-persistent scheduling (SPS) with some enhancements such as support for transport block (TB) repetitions. In type 1, UL data transmission with configured grant is only based on RRC (re)configuration without any L1 signaling. Type 2 is similar to the LTE SPS feature. UL data transmission with configured grant is based on both RRC configuration and layer-1 (L1) signaling for activation/deactivation of the grant. In this case, a gNB needs to explicitly activate the configured resources on PDCCH and the UE confirms reception of the activation/deactivation grant using a MAC control element.

NR SL radio resources are organized in REs, RBs, slots, and BWPs in a similar manner as UL/DL radio resources. SL supports transmission using 7-14 OFDM symbols, but any particular carrier is configured with only one transmission length at any time. SL radio resources also utilize sub-channels, which are collections of adjacent REs spanning an integer number of RBs in one transmission length (e.g., one slot). The sub-channel is the smallest unit that can be allocated for a normal SL transmission (carrying the physical sidelink shared channel, PSSCH). Sub-channel size is (pre)configured. SL resources are also organized as resource pools, which are collections of sub-channels adjacent in frequency but not necessarily in time. A resource pool is (pre) configured.

Broadcast, groupcast, and unicast transmission is supported for NR SL operation between two UEs. For unicast and groupcast SL transmissions, two types of hybrid ARQ (HARQ) feedback are supported. FIG. 7A shows a first type of NR SL HARQ based on ACK/NACK. When configured according to the first type of HARQ, UE 710 receiving (RX) a Transport Block (TB) of data sends an ACK or NACK to a transmitting UE 700, indicating that the TB was received correctly or incorrectly, respectively. Upon receiving a NACK, transmitting UE 700 will retransmit the same TB until receiving an ACK or reaching the maximum number of retransmissions.

FIG. 7B shows a second type of NR SL HARQ based only on NACK. In this arrangement, UE 710 receiving a TB is configured to send NACK when the TB is received incorrectly but does not send any feedback when the TB is received correctly. For example, if receiving UE 710 decodes a scheduling assignment (SA, e.g., in DCI) but fails to decode the associated TB, it transmits a NACK. On the other hand, the UE sends no feedback if it correctly decodes both SA and associated TB or if it fails to decode the SA. If transmitting UE 700 does not receive a NACK, it assumes that the TB it transmitted was correctly received and can therefore transmit new TBs. However, this arrangement does not distinguish between non-feedback cases of failed SA decoding or successful SA and TB decoding.

Two types of resource allocation modes are supported for NR SL transmissions between UEs. In NR SL resource allocation mode 2, the resource allocation is performed by UE itself, e.g., autonomously based on sensing the carrier/resource pool for availability. In particular, the UE determines available resources by decoding sidelink control information (SCI) received from other UEs and/or energy sensing and selects a set of idle/available resources to use for its SL transmission. This can be done in a similar manner as described above in relation to DCI.

In NR SL resource allocation mode 1, all SL transmissions between UEs are scheduled by the network (e.g., a serving gNB) using a configured grant or a dynamic grant. The network (e.g., serving gNB) can provide a UE with configured SL grant via radio resource control (RRC) configuration. Configured SL grants typically allocate resources having a periodic, semi-persistent pattern. Two types of configured SL grants are available, i.e., types 1 and 2. In type 2, the network can activate/deactivate the RRC-configured grant using DCI signaling.

On the other hand, dynamic grants are based on data being available for SL transmission, which triggers a buffer status report (BSR) by the UE having the data to send. If the UE already has an UL grant with enough resources, it will send the BSR to the gNB using these resources. Otherwise, it will trigger a SL scheduling request (SR) and send BSR on resources indicated by the UL grant in the responsive DCI from the gNB. After receiving the BSR, the gNB performs resource allocation and provides a SL grant to UE via downlink control information (DCI).

This SR/BSR scheme for SL (e.g., PC5 interface) follows similar principles as the SR/BSR scheme for UL/DL (e.g., Uu interface). For example, like Uu, NR SL also supports configuration of multiple dedicated SL SRs. Each SR configuration can be mapped to one or more logical channels, so that the UE uses the specific SR configuration depending on the logical channel (as indicated by a logical channel ID, or LCID) associated with the data available in the SL buffer. In addition, the UE may also use SL BSR to indicate the amount of data available in the SL buffer. Similar to Uu procedures, if there are insufficient UL resources available for the UE to transmit the triggered SL BSR, the UE will first send a SL SR and the network (e.g., gNB) will provide an UL grant for transmitting the BSR.

Retransmissions in NR SL resource allocation mode 1 are also scheduled by the gNB. To support this functionality, a UE sends explicit SL HARQ feedback to the gNB, based on the ACK/NACK feedback exchanged with the other UE via SL.

The 3GPP NR SL specifications include mechanisms for congestion control. The purpose is to ensure that the different UEs in the system make a fair use of shared resources, possibly according to the priorities of their transmissions. Congestion control is crucial in many SL scenarios, particularly those with minimal network control of and/or coordination between UEs. In allocation mode 2, as explained above, the UE is in control of most transmission parameters. Consequently, congestion may appear if UEs act in a selfish manner. Even in allocation mode 1, the UE is often in charge of setting transmission parameters that impact on resource utilization efficiency (e.g., in spectral efficiency, etc), such that congestion control is necessary here, too.

The framework for congestion control in NR SL can be described in terms of transmission restrictions that depend on different measurements performed by the UE and some additional parameters. The measurements may be external or internal. For example, the channel busy ratio (CBR) reflects the utilization of the channel by others perceived by a UE. In contrast, the channel occupancy ratio (CR) reflects the utilization of the channel by the UE itself (past and/or expected in the future).

More formally, Sidelink Channel Occupancy Ratio (SL CR) evaluated at slot n is defined as the total number of sub-channels used for a UE's transmissions in slots [n−a, n−1] and granted in slots [n, n+b] divided by the total number of configured sub-channels in the transmission pool over [n−a, n+b]. SL CR applies to UEs in RRC_IDLE (intra- or inter-frequency) or RRC_CONNECTED (intra- or inter-frequency).

In the above definition, "a" is a positive integer and "b" is 0 or a positive integer, with "a and b" determined by UE implementation according to $a+b+1=1000$ or $1000 \cdot 2^{\mu}$ slots (μ=numerology), based on higher layer parameter sl-TimeWindowSizeCR, $b<(a+b+1)/2$, and n+b shall not exceed the last transmission opportunity of the grant for the current transmission.

In addition, SL CR should be evaluated for each transmission or retransmission, and can be evaluated per priority level. In evaluating SL CR, the UE shall assume the transmission parameter used at slot n is reused according to the existing grant(s) in slot [n+1, n+b] without packet dropping. Also, the slot index is based on physical slot index and a resource is considered "granted" if it is a member of a selected SL grant as defined in 3GPP TS 38.321. Likewise, SL Channel Busy Ratio (SL CBR) measured in slot n is defined as the portion of sub-channels in the resource pool whose SL RSSI measured by the UE exceed a (pre)configured threshold sensed over a CBR measurement window [n−a, n−1], wherein a is equal to 100 or $100 \cdot 2^{\mu}$ slots (μ=numerology), according to higher layer parameter sl-TimeWindowSizeCBR. Applies to UEs in RRC_IDLE (intra- or inter-frequency) or RRC_CONNECTED (intra- or inter-frequency). The slot index is based on physical slot index.

LTE SL congestion control relies on similar metrics. For example, channel busy ratio (CBR) measured in subframe n is defined as follows:

For PSSCH, the portion of sub-channels in the resource pool whose S-RSSI measured by the UE exceed a (pre-)configured threshold sensed over subframes [n−100, n−1]; and For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain.

Likewise, channel occupancy ratio (CR) evaluated at subframe n is defined as the total number of sub-channels used for its transmissions in subframes [n−a, n−1] and granted in subframes [n, n+b] divided by the total number of configured sub-channels in the transmission pool over [n−a, n+b]. In the above, a is a positive integer and b is 0 or a positive integer; a and b are determined by UE implementation with a+b+1=1000, a>=500; and n+b should not exceed the last transmission opportunity of the grant for the current transmission.

In addition, CR should be evaluated for each transmission or retransmission, and can be evaluated per priority level. In evaluating CR, the UE shall assume the transmission parameter used at subframe n is reused according to the existing grant(s) in subframes [n+1, n+b] without packet dropping.

Both CBR and CR apply to UEs in RRC_IDLE (intra- or inter-frequency) or RRC_CONNECTED (intra- or inter-frequency). The subframe index is based on physical subframe index.

These measurements and parameters are used by the UE to determine the set of allowable values for the different transmission parameters. For example:

If the channel occupation is low, the UE may be allowed to perform a large number of retransmissions, using an MCS with low spectral efficiency (i.e., high redundancy).

If the channel occupation is high, the UE may be restricted to reduced number of retransmissions, using an MCS with a high spectral efficiency (i.e., low redundancy).

Figure 8:
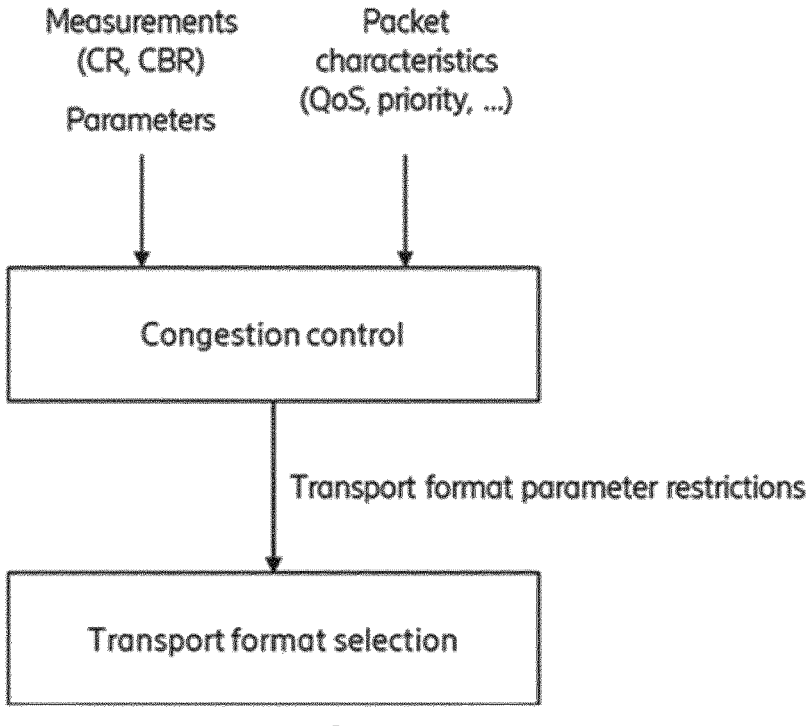
FIG. 8 is a flow diagram illustrating various steps for selection of SL transport format.

FIG. 8 is a flow diagram illustrating an exemplary UE selection of SL transport format based on congestion control. For each transmission, the UE selects values within the allowable ranges for each of the transmission parameters. Typical transmission parameters that the congestion control may act on include MCS, number of retransmissions, bandwidth allocation for each transmission, maximum channel occupancy ratio (i.e., maximum number of transmissions in a time interval), number of layers, and transmission power.

Congestion control may be configured to restrict all the parameters or only a few of them. Moreover, the restrictions may vary depending different characteristics of the message to be transmitted such as QoS parameters like priority, packet delay budget, etc. For example, more important or urgent packets may face looser restrictions than those with more relaxed requirements.

3GPP specifications also supports a mechanism that limits the allowable values for the different transmission parameters based on speed of a UE (absolute or relative) and synchronization source (e.g., GNSS, gNB, UE). Although this is not commonly referred to as congestion control, embodiments of the present disclosure are applicable to both mechanisms, which will be collectively referred to hereinafter as "congestion control".

Figure 9:
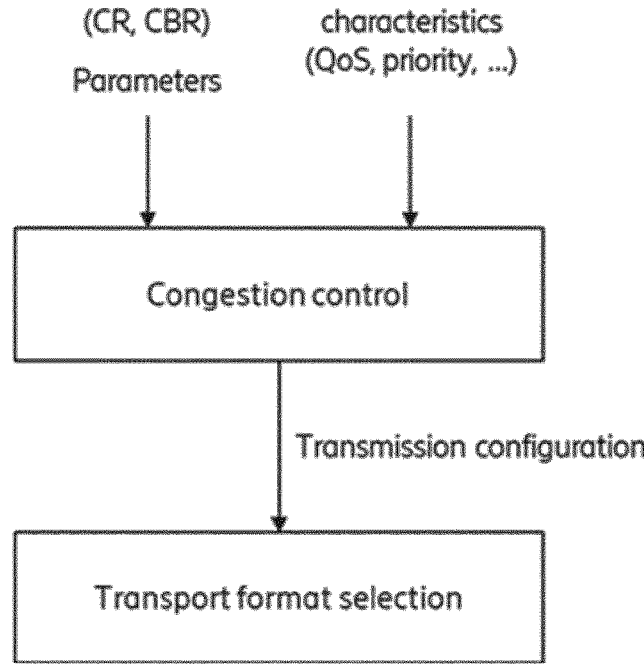
FIG. 9 is a flow diagram illustrating various steps for selection of SL transport format from a transmission configuration.

Additionally, a set of transmission parameters whose values can be restricted by congestion control will be referred to as a "transmission parameters". For example, congestion control may define multiple transmission parameter(s) and determine which one of the transmission parameter(s) to use based on channel state of the channel as well as characteristics of the packet(s) to be transmitted. The different parameters of the transport format are chosen so that they meet the restrictions set by the transmission configuration. FIG. 9 is a flow diagram illustrating an exemplary UE selection of SL transport format from a transmission configuration determined by congestion control.

3GPP Rel-17 includes SL enhancements that aim to extend V2X support and covering other use cases (UCs) such as public safety. One objective is to improve SL energy consumption of UEs that rely on a battery (e.g., pedestrian UEs, first responder UEs, etc.). Often a combination of features is needed to reduce UE energy consumption. One way to achieve this objective is by turning off the UE SL receiver in a systematic way. More specifically, discontinuous reception (DRX) includes a set of rules that determine when the UE is expected to be actively receiving and when it is not. A transmitting UE can communicate with a receiving UE in DRX if it is also aware of the rules applied by the receiving UE.

In addition to SL DRX, the Rel-17 SL enhancements include introduction of partial sensing, which can be seen as a complementary feature to DRX. Partial sensing facilitates Mode 2 operation even if the UE is not actively receiving at all times. In general, a common aspect SL DRX and partial sensing is that the UE switches its receiver ON and OFF regularly and/or systematically.

However, the procedures and measurements used for SL congestion control assume that the UE is continuously monitoring the channel. For example, the NR SL CR evaluated at slot n is defined as the total number of sub-channels used for UE transmissions in slots [n−a, n−1] and granted in slots [n, n+b] divided by the total number of configured sub-channels in the transmission pool over [n−a, n+b]. Likewise, the NR SL CBR measured in slot n is defined as the portion of sub-channels in the resource pool whose SL RSSI measured by the UE exceed a (pre-)configured threshold sensed over a CBR measurement window [n−a, n−1]. In other words, these assume that the UE is transmitting or receiving in all slots of the measurement windows. The LTE CR and CBR measurements are almost identical.

Therefore, if the UE is not actively receiving all the time, these measurements are not accurate. Moreover, different UEs could obtain very different measurements in the same just by being active at different times and for different durations.

Various embodiments of the present disclosure address these and other problems, and/or issues by providing techniques for congestion control using multiple transmission parameters, from which one or more transmission parameters can be selected by the UE based on activity of the UE's receiver and/or reception of an expected signal.

Various embodiments also include techniques for estimating congestion control metrics, by considering the activity of the UE's receiver and/or reception of an expected signal. Additionally, some embodiments may include application of various operations to account for limited UE reception during DRX. Unless specifically noted otherwise, various disclosed embodiments may be combined advantageously.

Disclosed embodiments can provide various benefits and/or advantages. For example, embodiments facilitate correct operation of UE congestion control with partial or discontinuous reception at the UE (e.g., in time domain and/or frequency domain).

Some embodiments of the present disclosure facilitate proper estimation of congestion control metrics during partial or discontinuous UE reception. In this manner, embodiments facilitate reduced energy consumption for UE SL operation while avoiding degradation of necessary congestion control for the SL channel.

Although the following description focuses on 3GPP NR SL and its associated terminology, principles of the disclosed embodiments are applicable to any kind of device-to-device (D2D) communications using congestion control and intermittent reception.

Although the following description focuses on intermittent UE reception in time (i.e., the UE turns its receiver on/off at various times), principles of the disclosed embodiments are applicable to discontinuous or intermittent reception in frequency. In such case, the UE only receives a sub-band of the entire system bandwidth (e.g., BWP, part of a pool of resources, etc.). Moreover, the received sub-band may vary over time. Similarly, some of the disclosed embodiments are applicable to multi-carrier operations in which the UE receives a subset of configured carriers at a given time, with the subset possibly varying over time.

In some embodiments, two transmission parameters can be defined. The transmission parameters can be selected for use depends on activity of the UE receiver within a particular time interval (i.e., the time that the UE is operating the receiver). For example, when the UE is actively receiving during at least N time resources (e.g., slots, subframes, etc.) within the time interval, then a first transmission parameter is used. The resources can be received continuously during the defined period or on intermittent occasions. Alternately, when the UE is actively receiving during less than the N time resources within the time interval, then a second transmission parameter is used. In various embodiments, the N time resources can be contiguous or intermittent within the defined time interval.

In some of these embodiments, more than two transmission parameters may be available for selection. As an example, a first transmission parameter can be selected for active reception less than N1, a second for active reception between N1 and N2 (>N1), and a third for active reception greater than N2. Other variations are also possible.

In these embodiments, there is no requirement that a UE receives a signal directed to the UE during a time resource, or that the UE decodes a signal. For example, the UE may be considered "actively receiving" during a time resource when it performs a measurement (e.g., RSSI or RSRP) of a broadcast signal (e.g., SSB).

In other embodiments, the transmission parameter selected for use depends on the reception (or not) of an expected signal (e.g., a periodic signal). One difference between this and the embodiments described above is that, rather than merely operating its receiver, the UE expects to receive a signal but it is unaware whether the expected signal will be received.

For example, a feedback channel may be used to determine which transmission parameter to use. When the UE receives a NACK, a second, more-restrictive transmission parameter can be selected for further transmissions. When the UE receives an ACK, a first, less-restrictive transmission parameter can be selected for further transmissions. In some examples, the selection can depend on whether a number (K) of ACKs or NACKs received within a particular duration. In some cases, the number "K" may identify consecutive ACKs or NACKs (i.e., without an intermediate opposite value).

In some of these embodiments, more than two transmission parameters may be available for selection. As an example, transmission parameters 1 . . . N can be defined, with 1 being the least restrictive and N being the most restrictive. Upon receiving one or more consecutive NACKs, the UE switches to the next more restrictive transmission parameter. Upon receiving one or more consecutive ACKs, the UE switches to the next less restrictive transmission parameter.

In some embodiments, the determination of whether a signal is received can be based on detection and/or decoding of the expected signal. In other embodiments, the determination of whether a signal is received can be based on a measured power or energy level. For example, a first transmission parameter can be selected if the UE measures a relatively high power level (e.g., greater than a threshold) for a broadcast transmission (e.g., SSB), and a second transmission parameter can be selected if the UE measures a relatively low power level (e.g., less than the threshold) for the broadcast transmission.

In some embodiments, the UE can select a transmission parameter based on the number of broadcast transmissions (e.g., SSB) received during a pre-defined time period $T_{S-SSB}$ (e.g., 160 ms). In a variant, a selected transmission parameters can be maintained for a period of time $T_{Broadcast} > K*T_{S-SSB}$, after which the UE can update the selection according to current reception conditions. These embodiments avoid excess switching of transmission configurations due to variations in reception due to changing channel conditions. The number K can be configured (e.g., by the network) or pre-defined (e.g., in 3GPP specification).

Other embodiments include techniques for estimation of congestion control metrics (e.g., channel utilization metric, channel occupancy ratio, channel busy ratio, etc.) when the UE is not continuously receiving (e.g., in DRX). Although these techniques are described separately, it should be noted that they can be readily combined with the techniques for transmission parameter(s) selection as described above.

In some examples, threshold(s) used for determining congestion control metrics can depend on activity of the UE receiver within a particular time interval (i.e., the time that the UE is operating the receiver). In some examples, the number of thresholds used may differ depending on activity of the UE receiver. In some examples, the threshold values may differ depending on activity of the UE receiver. In any case, the congestion control metric can be determined according to any technique that uses comparison to these thresholds, as those discussed above.

For example, when the UE is actively receiving during at least N time resources (e.g., slots, subframes, etc.) within the time interval, then a first set of N1 thresholds and their corresponding values can be used. The resources can be received continuously during the defined period or on intermittent occasions. Alternately, when the UE is actively receiving during less than the N time resources within the duration, then a second set of N2 thresholds and their corresponding values are used.

N1 can be the same as or different than N2. As an example, the first set of thresholds and corresponding values may be a superset of the second set of thresholds and their corresponding values (e.g., N1>N2).

In some examples, a first set of thresholds and/or corresponding values is used by a UE using a first sensing procedure and a second set of thresholds and/or corresponding values is used by a UE using a second sensing procedure. For example, the first sensing procedure can be or include full sensing (e.g., Rel-16 procedure), with/without re-evaluation and/or pre-emption, etc. Likewise, the second sensing procedure can be or include partial sensing, random resource selection, etc.

In some examples, the number and/or values of thresholds to be used can be based on and/or determined by a parameter associated with a resource allocation procedure. Examples of such parameters include sensing window size, selection window size, etc.

In some examples, the value of a congestion control metric can be estimated based on received feedback (e.g., ACK/NACK). For example, when ACK is received the congestion metric may be estimated as a relatively low value and when NACK is received the congestion metric may be estimated as a relatively high value (e.g., higher than the low value). In some variants, the congestion metric can be estimated based on multiple feedback messages received within a particular time interval, such as a particular number (K) of ACKs or NACKs, a ratio of ACKs to NACKs, etc.

In some examples, the congestion metric may have N>2 selectable values (e.g., C1 . . . CN). For example, the UE can select a congestion metric value based on the ratio of actually received (N)ACKs to expected number of (N)ACKs in a particular duration. With N=4 as a more specific example:

C1 is selected for the congestion metric when $0.75 < N_{received}/N_{expected}$;

C2 is selected for the congestion metric when $0.5 < N_{received}/N_{expected} \le 0.75$;

C3 is selected for the congestion metric when $0.25 < N_{received}/N_{expected} \le 0.5$; and C4 is selected for the congestion metric when $0 < N_{received}/N_{expected} \le 0.25$, where $N_{received}$ and $N_{expected}$ are numbers of received and expected (N)ACKs, respectively.

Figure 10:
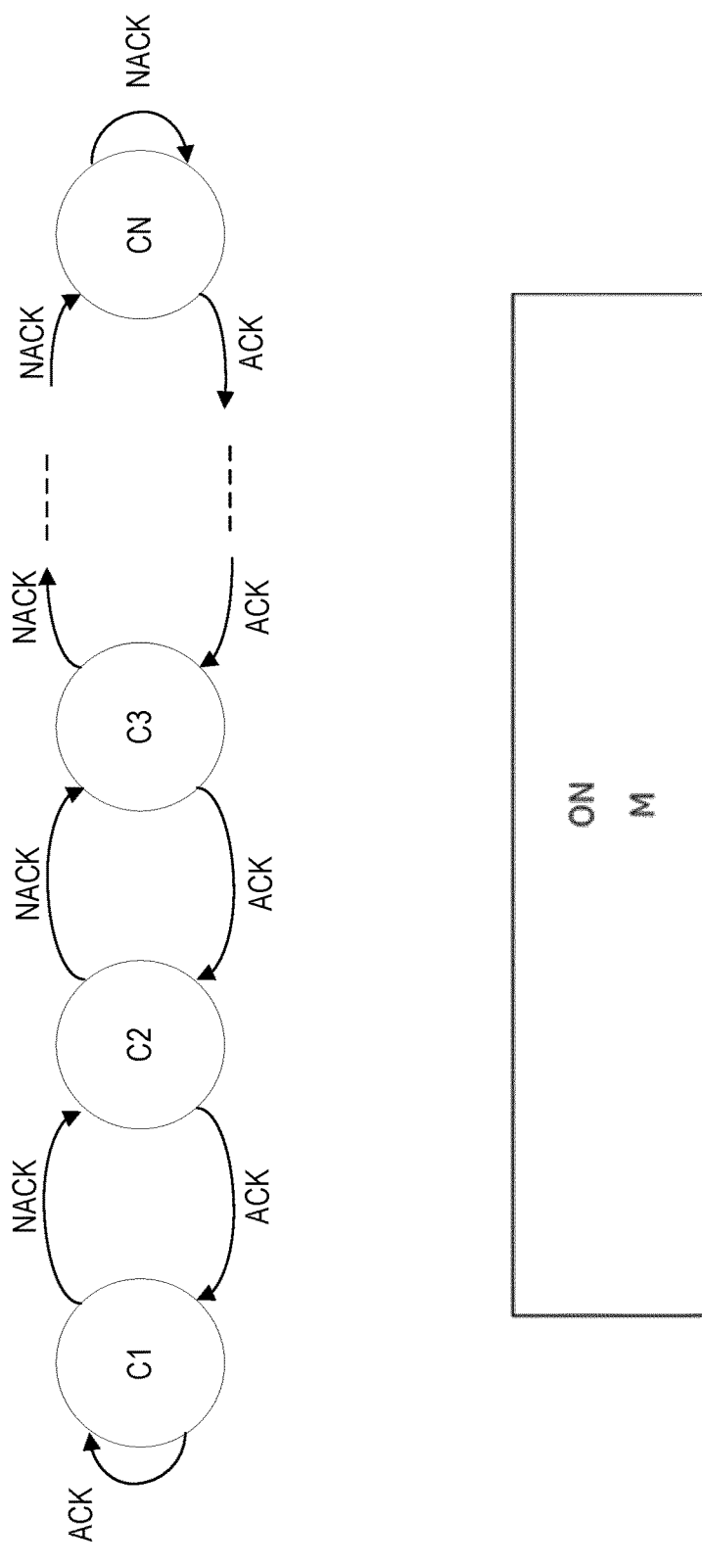
FIG. 10 shows an exemplary congestion metric selection rule, according to some embodiments.

In some examples, the selection of congestion metric can be based on rule that causes an ordered transition between multiple metric values. For example, metric values C1 . . . CN can be defined, with C1 indicating the least restrictive congestion metric and CN indicating the most restrictive congestion metric. Upon receiving one or more consecutive NACKs, the UE selects the next more restrictive congestion metric value (no greater than CN). Upon receiving one or more consecutive ACKs, the UE selects the next less restrictive congestion metric value (no less than C1). FIG. 10 shows an exemplary congestion metric selection rule according to these embodiments. Note that the arrangement shown in FIG. 10 can be considered a state transition diagram, with the various C1 . . . CN as the states.

In other examples, the UE can determine a congestion metric based on the time that the UE is active or that the UE is configured to be active. For example, instead of determining the congestion control metric (e.g., CR or CBR) as a fraction or portion of a total number of configured sub-channels, the congestion control metric is determined as a fraction or portion of a subset of the total number of configured sub-channels. In some of these embodiments, the subset can be (or correspond to) sub-channels in which the UE has been actively receiving.

In some examples, the subset can be (or correspond to) a number of sub-channels in which the UE is configured to receive. This can be based on and/or related to a parameter from a DRX configuration, e.g., DRX cycle duration or DRX active time. Alternately, this can be based on a parameter of a partial sensing configuration that relates to when the UE is expected to be active (e.g., periodicity, number of time resources, time window, sensing window, etc.). Alternately, this can be based on frequency-related parameters such as part of a resource pool, a BWP, etc.

In some examples, the UE may only receive in a fraction of the time resources, e.g., when the UE is using partial sensing (in time) or DRX. For example, the UE receives sub-channels in the time interval $[T_a, T_b]$ but not sub-channels in the time interval $[T_c, T_d]$. In other variants, the UE may only receive in a fraction of the frequency resources, e.g., when the UE is only tuned to part of a bandwidth, part of a pool of resources, a BWP, etc. For example, the UE receives sub-channels in the sub-band $[F_a, F_b]$ but not those in the sub-band $[F_c, F_d]$.

Figure 11:
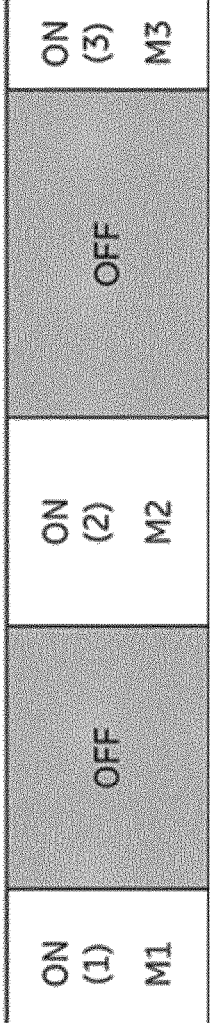
FIG. 11 illustrates a measurement window having a single metric with a compound measurement window having three metrics corresponding to respective active times for a UE, according to some embodiments.

In other examples, the UE can determine a congestion metric using compound windows and weighting factors in conjunction with existing congestion metric determination techniques. For example, a compound measurement window can be a concatenation of partial measurement windows. A UE can obtain a partial metric for each partial measurement window and calculate the compound metric by combining the partial metrics for the different windows. FIG. 11 shows an exemplary comparison of a single measurement window having a single metric with a compound measurement window having three individual metrics (M1-M3) corresponding to respective ON times for the UE.

In some examples, the compound metric can be obtained by summing the partial metrics, each weighted by a factor proportional to metric recency. In other words, partial metrics for less recent partial measurement windows are given smaller weights than partial metrics for more recent partial measurement windows.

In other examples, the compound metric can be obtained by summing the partial metrics weighted by a factor proportional to active reception time. In this manner, greater weight is given to partial measurement windows with greater active reception time. For example, if the UE is actively receiving during T1 time units in partial measurement window 1 (of duration T time units) and actively receiving during T2 time units in partial measurement window 2 (also of duration T) too, a weight for the first partial metric can be T1/(T1+T2) and a weight for the second partial metric can be T2/(T1+T2).

In some examples, any partial metrics for partial measurement windows during which the UE is actively receiving below a threshold (e.g., number of time resources, percentage of time resource, etc.) are not used in computation of the compound metric. In other words, such partial metrics are given zero weight. In other of these embodiments, the highest (or lowest) partial metric can be selected as the compound metric. In other words, the selected partial metric is given all available weight.

The embodiments described above can be further illustrated with reference to FIG. 12, which depicts an exemplary method for a UE. In other words, various features of operations described below correspond to various aspects of embodiments described above. Although the exemplary method is illustrated in FIG. 12 by specific blocks in a particular order, the operations corresponding to the blocks can be performed in different orders than shown and can be combined and/or divided into blocks having different functionality than shown. Optional blocks and/or operations are indicated by dashed lines.

FIG. 12A is a flow diagram illustrating example method steps performed by the UE. The exemplary method 1200 shown in FIG. 12A can be performed by the UE (e.g., the wireless device, the V2X UE, the D2D UE, etc.) configured as shown in other figures described above.

At block 1220, the method 1200 comprises determining that the UE is based on actively receiving in a subset of resources during a time interval. In some embodiments, the UE can be configured for device-to-device (D2D) wireless communication via the channel.

In some embodiments, the UE is in a low-energy state with respect to the remaining set of resources (i.e., other than the subset) during the time interval.

In some examples, the subset of resources include, a first subset of time intervals within the time interval, a second subset of sub-channel within the system bandwidth and a third subset of carriers configured for the UE.

In some examples, for each particular resource of the subset, it is determined that the UE is actively receiving in the subset of resources comprises performing one or more of the following by the UE:

performing a measurement of the channel;

attempting to receive an expected signal;

receiving the expected signal;

decoding the received expected signal.

At step 1240, the method 1200 comprises estimating a congestion control metric for the time interval during which the UE is actively receiving in a subset of resources.

In some embodiments, the congestion control metric is estimated in relation to the subset of resources in which the UE is actively receiving within the time interval. In one example, the congestion control metric is estimated in relation to the first subset of time intervals. In another example, the congestion control metric is estimated in relation to the second subset of sub-channels and in another example, the congestion control metric is estimated in relation to the third subset of the carriers configured for the UE.

In some examples, estimating a congestion control metric for the time interval can include selecting one of a plurality of available values based on the subset of the resources. In some of examples, the plurality of available values can be associated with a respective plurality of non-overlapping ranges of a ratio of the subset to the total resources over the time interval.

In some examples, actively receiving in the subset of resources can include one or more operations performed by the UE. The UE can receive an acknowledgement (ACK) signal in each resource comprising the subset. Further, the UE can receive a negative ACK (NACK) signal in each resource comprising the subset of the resources. In other words, the UE can select a congestion metric based on the ratio of actually received ACKs (i.e., in the subset) to expected ACKs (i.e., for the duration), or a ratio of actually received NACKs to expected NACKs.

In some examples, the available values for each congestion metric can be associated with respective levels of restrictive transmission, and the subset of resources can include one or more time intervals. In such examples, a next less-restrictive value, than a most recently selected value, can be selected when the UE receives one or more acknowledgement (ACK) signals during the respective one or more time intervals. Likewise, a next more-restrictive value, than the most recently selected value, can be selected when the UE receives one or more negative ACK (NACK) signals during the respective one or more time intervals. An example of these embodiments is illustrated in FIG. 10.

At step 1260, the method comprises selecting one or more transmission parameters to use for SL transmissions in accordance with the estimated congestion control metric. For example, selecting one or more transmission parameters include selecting the transmission parameter i.e., a value for a transmission parameter (e.g., tx parameter=tx power, value=25 dBm).

In some examples, the one or more transmission parameters include one or more congestion control transmission parameter for sidelink V2V transmissions, which include at least one of a maximum number of transmission time intervals (TTIs) used per transport block (TB), a maximum number of sub-channels able to be used per TB transmission, a range of effective code rates per TB transmission, or a minimum inter-TB transmission interval.

In other examples, the one or more transmission parameters can include first and second transmission parameters. For example, the first transmission parameter can be less restrictive than the second transmission parameter.

At step 1280, the method comprises performing the SL transmission using the one or more selected transmission parameters. For example, the UE performs the transmission using the one or more selected transmission parameters as described above.

FIG. 12B is a flow chart illustrating example steps performed by the UE for estimating the congestion control metric. At step 1241, the method 1240 comprises defining a plurality of thresholds. For example, each threshold is defined as a value. At step 1242, the method 1240 comprises defining a plurality of congestion control configurations. In some examples, the plurality of congestion control configurations include a first congestion control configuration, a second congestion control configuration, a third congestion control configuration and so on.

At step 1243, the method comprises selecting a congestion control configuration among the plurality of congestion control configurations by comparing a number of resources in the subset of resources in which the UE is actively receiving to one or more thresholds among the plurality of thresholds.

In some examples, the first congestion control configuration can be selected when the number of resources in the subset is less than a defined threshold of the resources. In some examples, the second congestion control configuration can be selected when the number of resources in the subset of the resources in which the UE is actively receiving is at least the threshold value.

In some examples, the congestion control configurations can also include a third congestion control configurations. In such cases, the second congestion control configuration can be selected when the number of resources in the subset of the resources is also less than a second threshold of the resources during the time interval, and the third congestion control configuration can be selected when the number of resources in the subset of the resources is at least the second threshold.

In some embodiments, the time interval can include a single time interval. In such embodiments, the first congestion control configuration can be selected when the UE receives an acknowledgement (ACK) signal during the time interval, and the second congestion control configuration can be selected when the UE does not receive the ACK signal during the time interval. For example, the UE may receive a NACK instead of an ACK during the time interval. In some cases, the available congestion control configurations also include a third congestion control configuration that is more restrictive than the second congestion control configuration. In such cases, a congestion control configuration that is next less-restrictive, than a most recently selected congestion control configuration, is selected when the UE receives an acknowledgement (ACK) signal during the time interval. Likewise, a congestion control configuration that is next more-restrictive, than the most recently selected congestion control configuration, is selected when the UE does not receive the ACK signal during the time interval.

In some examples, the subset of the resources can be a first plurality of time intervals comprising the time interval. In such embodiments, the first congestion control configuration can be selected when the UE receives a respective first plurality of acknowledgement (ACK) signals during the first plurality of time intervals, and the second congestion control configuration can be selected when the UE does not receive the first plurality of ACK signals during the time interval.

In some examples, the first and the second congestion control configurations can differ in number of thresholds included and/or values associated with defined thresholds. In some cases, the second congestion control configuration can be a subset of the first congestion control configuration.

In some examples, the first and second congestion control configurations can be associated with different sensing procedures used in monitoring the channel and/or different resource allocation procedures.

At step 1244, the method 1240 comprises selecting the one or more transmission parameters to use for SL transmissions in accordance with selected congestion control configuration.

FIG. 12C is a flow chart illustrating example steps of a method 1240 performed by the UE according to some embodiments. At step 1251, the method 1240 comprises defining a plurality of sets of thresholds. For example, the sets of thresholds includes a set of values. The sets of thresholds may be different depending on the subset of the resources in which the UE is actively receiving.

In one example the first set of thresholds and corresponding values may be a superset of the second set of thresholds and their corresponding values.

In another example, a first set of thresholds and/or corresponding values is used by a UE using a first sensing procedure (e.g., full sensing, like the Rel-16 procedure, with/without re-evaluation and/or pre-emption, etc.) and a second set of thresholds and/or corresponding values is used by a UE using a second sensing procedure (e.g., partial sensing, random resource selection, etc.)

In another example, the set of thresholds and/or corresponding values to be used is determined by a resource allocation procedure parameter such as, for example, a sensing window size, a selection window size, etc., At step 1252, the method 1240 comprises selecting one set of thresholds among the plurality of thresholds as a function of the subset of the resources in which the UE is actively receiving. For example, a first set of thresholds is selected among the plurality of thresholds.

At 1253, the method 1240 comprises selecting one or more transmission parameters by comparing the estimated congestion control metric to the one or more thresholds in the selected set of thresholds.

Figure 12D:
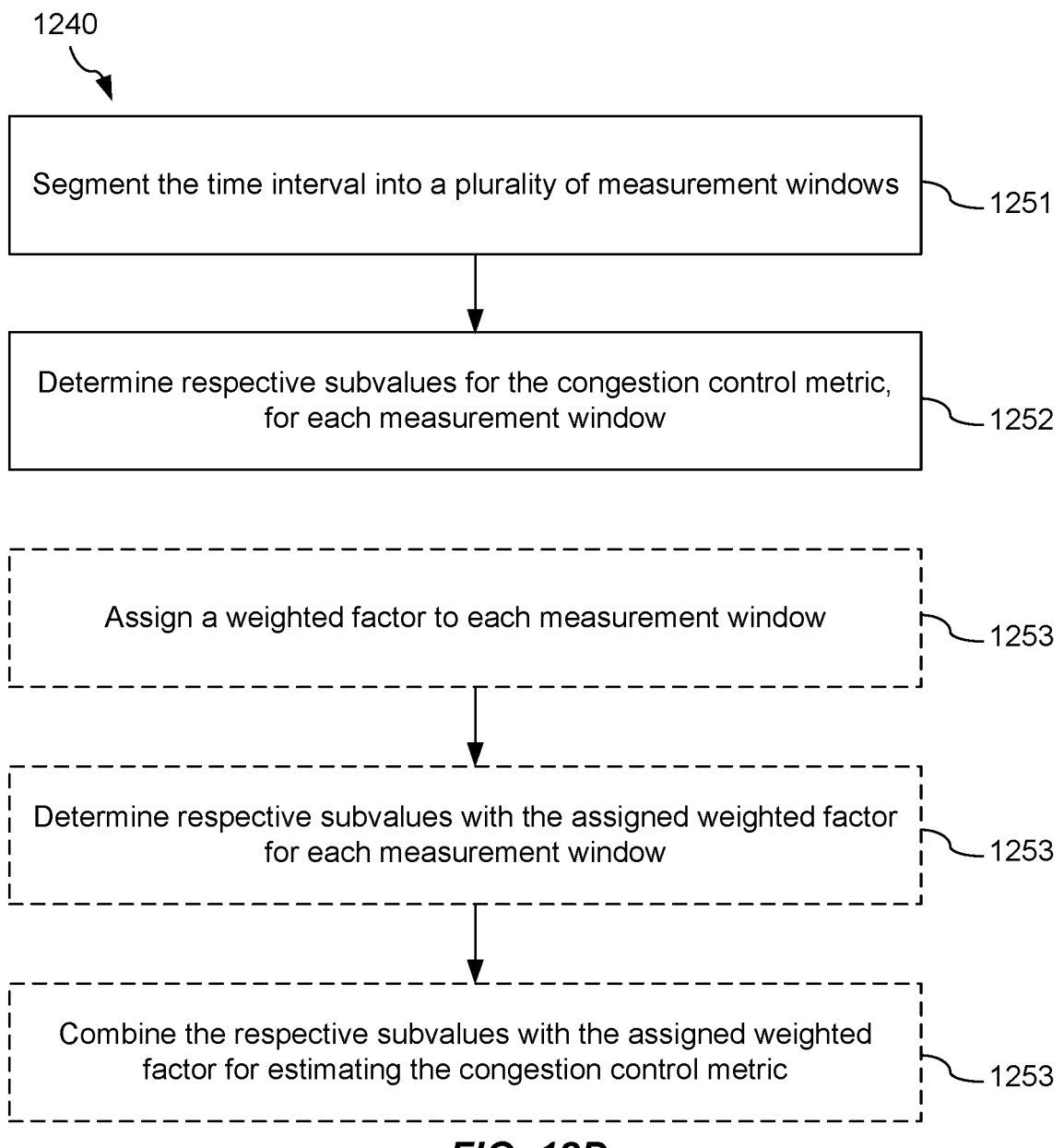

FIG. 12D is a flow chart illustrating example steps of a method 1240 performed by the UE, according to some embodiments. At step 1254, the method 1240 comprises segmenting the time interval into a plurality of measurement windows. In an example, the time interval can include a plurality of measurement windows. Thus, the time interval is segmented into the plurality of measurement windows as illustrated in FIG. 11. In some examples, the In some examples, the subset of the resources can include a plurality of ranges during the respective plurality of measurement windows (i.e., a contiguous or non-contiguous range within each measurement window). In such case, at step 1255, the method 1240 comprises determining respective sub-values for the congestion metrics based on the respective ranges.

Optionally, at step 1256, the method 1240 comprises assigning a weighted factor to each of the measurement windows. For example, the weighted factor to each of the measurement windows is determined based on a time interval associated with each measurement window.

Optionally, at step 1257, the method 1240 comprises determining respective sub-values with the assigned weighted factors for each measurement window. At step 1258, the method 1240 comprises combining the respective sub-values with the assigned weighted factors for estimating the congestion control metric for the time interval. An example of these steps is illustrated in FIG. 11 described above.

In some of these embodiments, combining the respective sub-values comprises weighting the respective sub-values based on one or more of the following:

in proportion to recency and/or duration of the respective measurement windows;

whether associated ranges are less than a threshold (e.g., those less than the threshold are weighted zero); and a maximum or minimum of the respective sub-values (e.g., those other than the maximum or minimum are weighted zero).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 13:
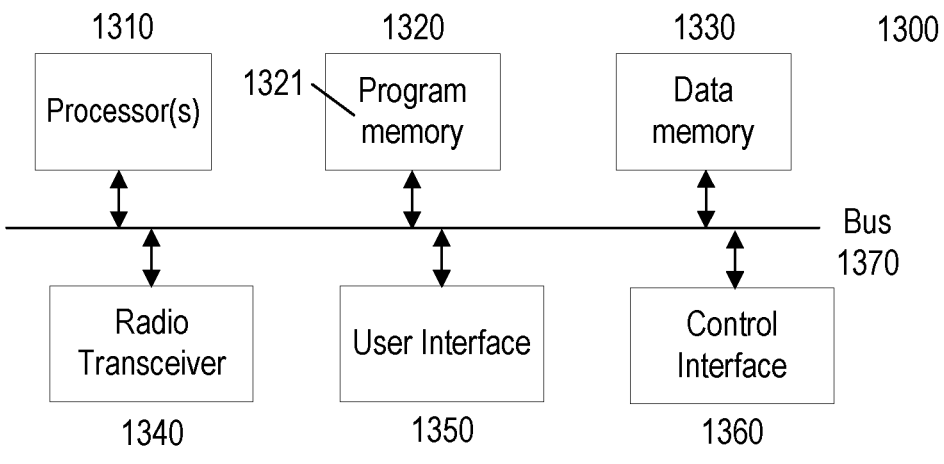
FIG. 13 shows a block diagram of the UE, according to some embodiments.

FIG. 13 shows a block diagram of an exemplary wireless device or user equipment (UE) 1300 (hereinafter referred to as "UE 1300") according to embodiments of the present disclosure, including those described above with reference to other figures. For example, UE 1300 can be configured by execution of instructions, stored on a computer-readable medium, to perform operations corresponding to one or more of the exemplary methods described herein.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1321 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or control interface 1360. Program memory 1320 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods described herein. Moreover, program memory 1320 and/or data memory 1330 can include non-volatile memory (e.g., flash memory), volatile memory (e.g., static or dynamic RAM), or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some exemplary embodiments, the radio transceiver 1340 includes one or more transmitters and one or more receivers that enable UE 1300 to communicate according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some exemplary embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some exemplary embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible devices.

In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 Wi-Fi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1300 having a touch screen display are capable of receiving user inputs, such as inputs related to exemplary methods described herein or otherwise known to persons of ordinary skill.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 130-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1360 of the UE 1300 can take various forms depending on the particular exemplary embodiment of UE 1300 and of the particular interface requirements of other devices that the UE 1300 is intended to communicate with and/or control. For example, the control interface 1360 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including any program code corresponding to and/or embodying any exemplary embodiments (e.g., of methods) described herein.

Figure 14:
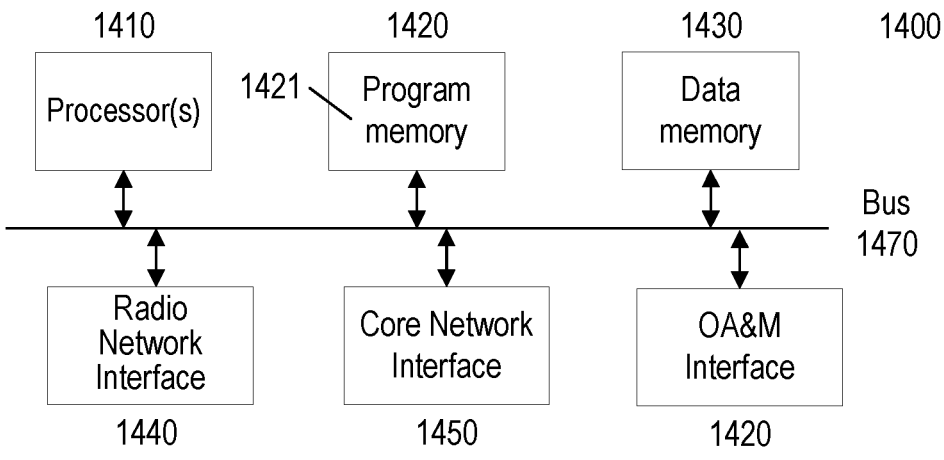
FIG. 14 shows a block diagram of a network node, according to some embodiments.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods described herein. In some exemplary embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which implements a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some exemplary embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some exemplary embodiments, core network interface 1450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN, such as with other eNBs, gNBs, ng-eNBs, en-gNBs, IAB nodes, etc. Such hardware and/or software can be part of radio network interface 1440 and/or core network interface 1450, or it can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
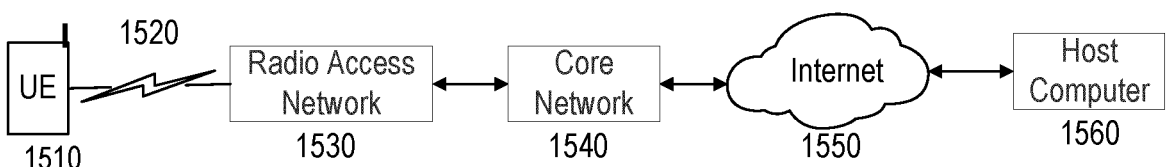
FIG. 15 shows a block diagram of an example network configured to provide over-the-top (OTT) data services between a host computer and a UE, according to various exemplary embodiments of the present disclosure.

FIG. 15 is a block diagram of an exemplary communication network configured to provide over-the-top (OTT) data services between a host computer and a user equipment (UE), according to one or more exemplary embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1550 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface. As another example, gNBs and ng-eNBs comprising an NG-RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques for congestion control using multiple transmission configurations, from which one can be selected by a UE based on activity of the UE's receiver and/or reception of an expected signal. Embodiments also include techniques for estimating congestion control metrics, which can also consider activity of the UE's receiver and/or reception of an expected signal. When used in NR UEs (e.g., UE 1510) and gNBs (e.g., gNBs comprising RAN 1530), exemplary embodiments described herein can facilitate reduced energy consumption for UE operation (e.g., in SL and/or D2D) while avoiding degradation of necessary congestion control for a shared channel. Consequently, this increases benefits and/or value of SL/D2D services to end users and service providers.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

In the present disclosure, it is assumed that connection establishment has already been completed between the UE(s) and the network nodes.

The embodiments disclosed herein can be implemented through at least one software program running on at least one hardware device and performing network management functions to control the elements. The elements shown in FIGS. 1-15 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method performed by a user equipment (UE) configured for congestion control during sidelink transmissions in a wireless communication network, the method comprising:

determining that the UE is actively receiving in a subset of resources during a time interval;

estimating a congestion control metric for the time interval during which the UE is actively receiving in the subset of resources; and selecting one or more transmission parameters to use for sidelink transmissions in accordance with the estimated congestion control metric, wherein the selecting comprises:

defining a plurality of thresholds and a plurality of congestion control configurations;

selecting a congestion control configuration among the plurality of congestion control configurations by comparing the number of resources in the subset of resources in which the UE is actively receiving within a time interval to one or more thresholds among the plurality of thresholds; and selecting the one or more transmission parameters to use for sidelink transmissions in accordance with the selected congestion control configuration.

2. The method of claim 1, wherein the subset of resources comprises one or more of:

a first subset of time intervals within the time interval;

a second subset of sub-channels within a configured bandwidth; and a third subset of the carriers configured for the UE.

3. The method of claim 1, wherein the congestion control metric is estimated in relation to the subset of resources in which the UE is determined to be actively receiving during the time interval.

4. The method of claim 2, further comprising:

obtaining a subset of a total number of configured sub-channels in which the UE is actively receiving; and estimating the congestion control metric as a portion of the subset of the total number of configured sub-channels.

5. The method of claim 1, wherein estimating a congestion control metric for the time interval during which the UE is actively receiving in the subset of resources comprises estimating one or more of the following:

a congestion control metric in relation to the first subset of time intervals;

a congestion control metric in relation to the second subset of sub-channels; and a congestion control metric in relation to the third subset of the carriers configured for the UE.

6. The method of claim 1, further comprising:

defining a plurality of sets of thresholds;

selecting one set of the plurality of sets of thresholds as a function of the subset of resources in which the UE is actively receiving within a time interval; and selecting one or more transmission parameter(s) to use for sidelink transmissions by comparing the estimated congestion control metric to the one or more thresholds in the selected set of thresholds.

7. The method of claim 1, wherein estimating a congestion control metric for the time interval comprises:

segmenting the time interval into a plurality of measurement windows;

determining respective subvalues for the congestion control metric, for each measurement window; and estimating the congestion control metric by combining the respective subvalues for each measurement window.

8. The method of claim 7, wherein estimating the congestion control metric by combining the respective subvalues for each measurement window comprises:

assigning a weighted factor to each measurement window;

determining respective subvalues with the assigned weighted factor for each measurement window; and combining the respective subvalues with the assigned weighted factor to obtain the estimated congestion control metric.

9. The method of claim 8, wherein the weighted factor assigned to each measurement window is determined based on a time interval associated with the measurement window.

10. The method of claim 1, further comprising performing a sidelink transmission using the selected one or more transmission parameters.

11. The method of claim 1, wherein the congestion control metric includes one or more of the following: channel busy ratio (CBR), and channel occupancy ratio (CR).

12. A user equipment (UE) configured for congestion control during sidelink transmissions in a wireless communication network, the UE comprising processing circuitry configured to:

determine that the UE is actively receiving in a subset of resources during a time interval;

estimate a congestion control metric for the time interval during which the UE is actively receiving in the subset of resources; and select one or more transmission parameters to use for sidelink transmissions in accordance with the estimated congestion control metric, based on:

defining a plurality of thresholds and a plurality of congestion control configurations;

selecting a congestion control configuration among the plurality of congestion control configurations by comparing the number of resources in the subset of resources in which the UE is actively receiving within a time interval to one or more thresholds among the plurality of thresholds; and selecting the one or more transmission parameters to use for sidelink transmissions in accordance with the selected congestion control configuration.

13. The UE of claim 12, wherein the subset of resources comprises one or more of the following:

a first subset of time intervals within the time interval;

a second subset of sub-channels within a configured bandwidth; and a third subset of the carriers configured for the UE.

14. The UE of claim 12, wherein the congestion control metric is estimated in relation to the subset of resources in which the UE is determined to be actively receiving during the time interval.

15. The UE of claim 13, wherein the processing circuitry is further configured to:

obtain a subset of a total number of configured sub-channels in which the UE is actively receiving; and estimate the congestion control metric as a portion of the subset of the total number of configured sub-channels.

16. The UE of claim 13, wherein the processing circuitry is configured to estimate the congestion control metric for the time interval during which the UE is actively receiving in the subset of resources by estimating one or more of the following:

a congestion control metric in relation to the first subset of time intervals;

a congestion control metric in relation to the second subset of sub-channels; and a congestion control metric in relation to the third subset of the carriers configured for the UE.

17. The UE of claim 12, wherein the processing circuitry is further configured to:

define a plurality of sets of thresholds;

select one set of the plurality of sets of thresholds as a function of the subset of resources in which the UE is actively receiving within a time interval; and select the one or more transmission parameters to use for sidelink transmissions based on comparing the estimated congestion control metric to the one or more thresholds in the selected set of thresholds.

18. The UE of claim 12, wherein the processing circuitry is configured to estimate a congestion control metric for the time interval based on:

segmenting the time interval into a plurality of measurement windows;

determining respective subvalues for the congestion control metric, for each measurement window; and estimating the congestion control metric by combining the respective subvalues for each measurement window.

19. The UE of claim 18, wherein the processing circuitry is configured to estimate the congestion control metric by combining the respective subvalues for each measurement window based on:

assigning a weighted factor to each measurement window;

determining respective subvalues with the assigned weighted factor for each measurement window; and combining the respective subvalues with the assigned weighted factor to obtain the estimated congestion control metric.

20. The UE of claim 19, wherein the weighted factor assigned to each measurement window is determined based on a time interval associated with the measurement window.

21. The UE of claim 12, further comprising radio transceiver circuitry operably coupled to the processing circuitry, wherein the processing circuitry and the radio transceiver circuitry are further configured to perform a sidelink transmission using the selected one or more transmission parameters.

22. The UE of claim 12, wherein the congestion control metric includes one or more of the following: channel busy ratio (CBR), and channel occupancy ratio (CR).

23. A non-transitory computer readable medium storing computer executable instructions that, when executed by processing circuitry of a user equipment (UE) configured for congestion control during sidelink transmissions in a wireless communication network, configure the UE to perform operations corresponding to the method of claim 1.

* * * * *